(12) United States Patent
Hayashi et al.

(10) Patent No.: US 12,555,977 B2
(45) Date of Patent: Feb. 17, 2026

(54) LASER MODULE

(71) Applicant: HAMAMATSU PHOTONICS K.K., Hamamatsu (JP)

(72) Inventors: Shohei Hayashi, Hamamatsu (JP); Kazuue Fujita, Hamamatsu (JP); Akio Ito, Hamamatsu (JP); Atsushi Nakanishi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 443 days.

(21) Appl. No.: 18/124,658

(22) Filed: Mar. 22, 2023

(65) Prior Publication Data

US 2023/0318255 A1     Oct. 5, 2023

(30) Foreign Application Priority Data

Mar. 29, 2022   (JP) ................. 2022-053473

(51) Int. Cl.
*H01S 5/34*       (2006.01)
*H01S 5/02216*    (2021.01)
(Continued)

(52) U.S. Cl.
CPC ...... *H01S 5/02253* (2021.01); *H01S 5/02216* (2013.01); *H01S 5/02315* (2021.01);
(Continued)

(58) Field of Classification Search
CPC ............. H01S 5/02253; H01S 5/02216; H01S 5/02315; H01S 5/0607; H01S 5/141;
(Continued)

(56) References Cited

U.S. PATENT DOCUMENTS

| | | | |
|---|---|---|---|
| 2010/0002739 A1 | 1/2010 | Hu et al. | |
| 2015/0311665 A1* | 10/2015 | Belkin | G02F 1/365 |
| | | | 372/20 |

(Continued)

FOREIGN PATENT DOCUMENTS

| | | |
|---|---|---|
| CN | 112072457 A | 12/2020 |
| JP | 2017-050308 A | 3/2017 |

(Continued)

*Primary Examiner* — Xinning (Tom) Niu
(74) *Attorney, Agent, or Firm* — Faegre Drinker Biddle & Reath LLP

(57) ABSTRACT

The laser module includes a QCL element and a support member. The QCL element has a first end surface located on a first side in a second direction orthogonal to a stacking direction and a second end surface located on a second side opposite to the first side in the second direction. The substrate has first to fourth substrate-surfaces. The support member has a first portion having a first surface facing at least a portion of the fourth substrate-surface, and a second portion having a second surface facing at least a portion of the first substrate-surface and a third surface located opposite to the second surface in the second direction. At least a part of the terahertz wave generated in the active layer is incident on the second surface of the support member through the substrate and is emitted from the third surface through the inside of the second portion.

20 Claims, 13 Drawing Sheets

(51) Int. Cl.
*H01S 5/02253* (2021.01)
*H01S 5/02315* (2021.01)
*H01S 5/06* (2006.01)
*H01S 5/14* (2006.01)

(52) U.S. Cl.
CPC ............ *H01S 5/0607* (2013.01); *H01S 5/141* (2013.01); *H01S 5/3402* (2013.01); *H01S 2302/02* (2013.01)

(58) Field of Classification Search
CPC .. H01S 5/3402; H01S 2302/02; H01S 3/1055; H01S 5/0604; H01S 5/1096; H01S 5/04257; H01S 5/12; H01S 5/2031; H01S 5/2224; H01S 5/227; H01S 5/3211; H01S 5/3401; H01S 5/02326; H01S 5/0206; H01S 5/028
See application file for complete search history.

(56) References Cited

U.S. PATENT DOCUMENTS

| | | | | |
|---|---|---|---|---|
| 2015/0318668 | A1* | 11/2015 | Yoshinaga | ............ H01S 5/0203 438/26 |
| 2017/0063044 | A1* | 3/2017 | Dougakiuchi | ........ H01S 5/1221 |
| 2018/0069374 | A1* | 3/2018 | Kakuno | .................... H01S 5/22 |

FOREIGN PATENT DOCUMENTS

| | | | | |
|---|---|---|---|---|
| JP | 2019-036577 A | 3/2019 | | |
| WO | WO-2008073085 A2 * | 6/2008 | ............ | H01S 5/405 |
| WO | 2021/125240 A1 | 6/2021 | | |

* cited by examiner

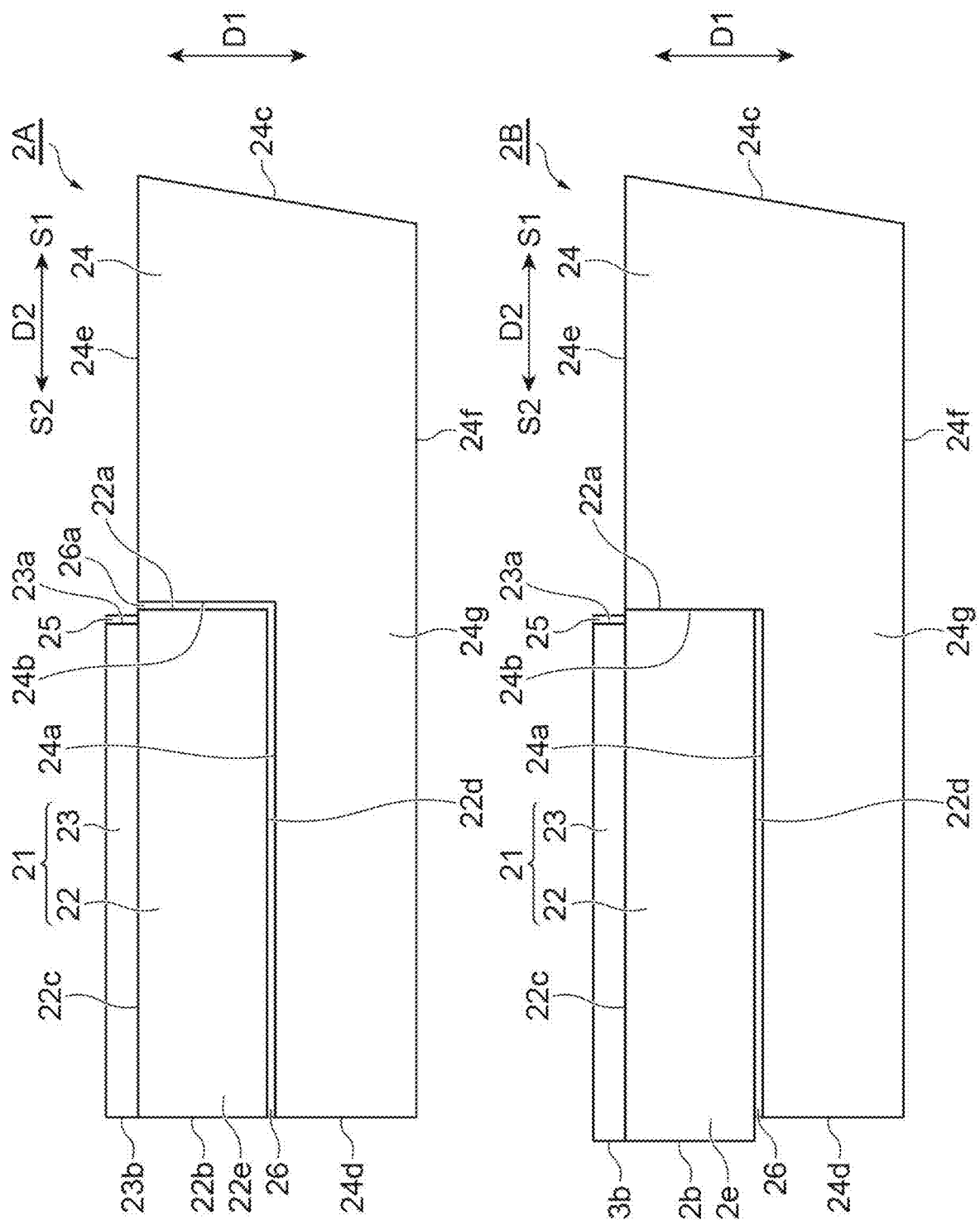

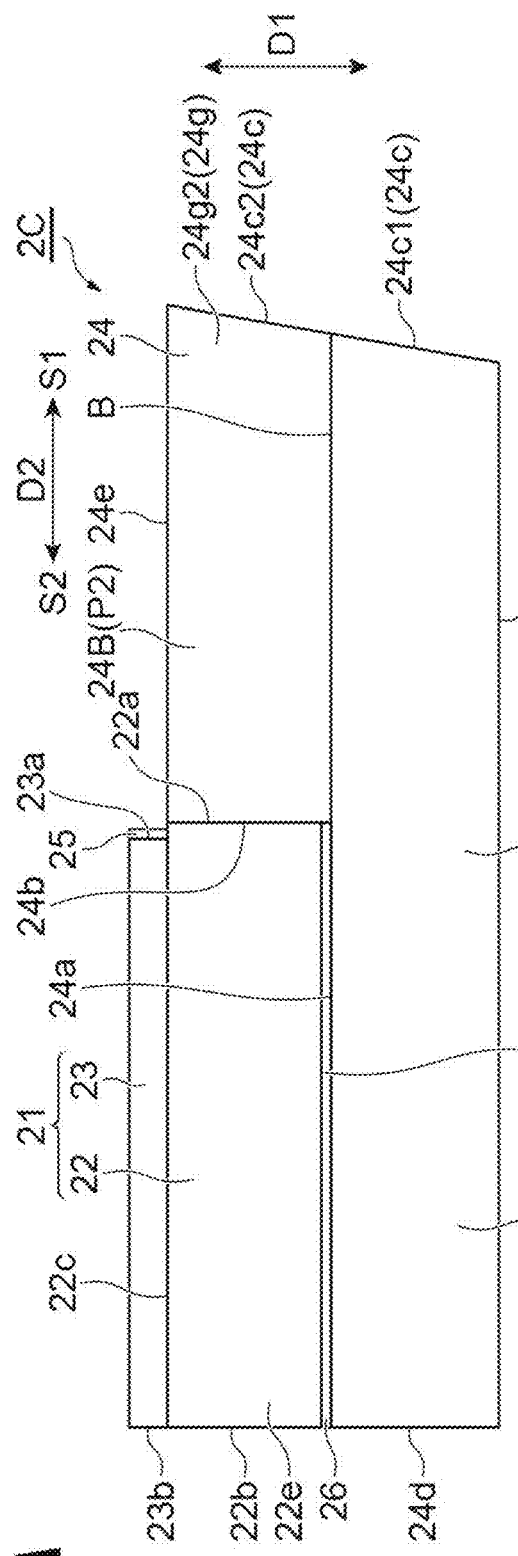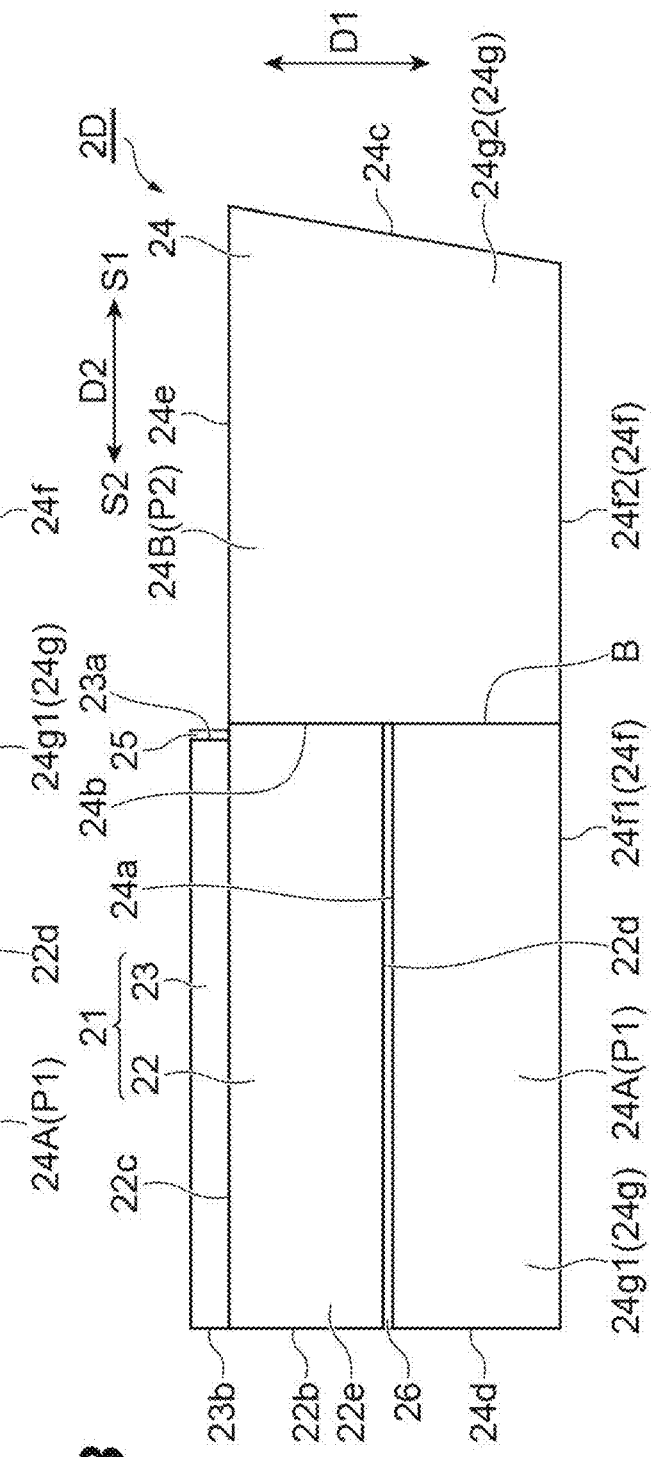

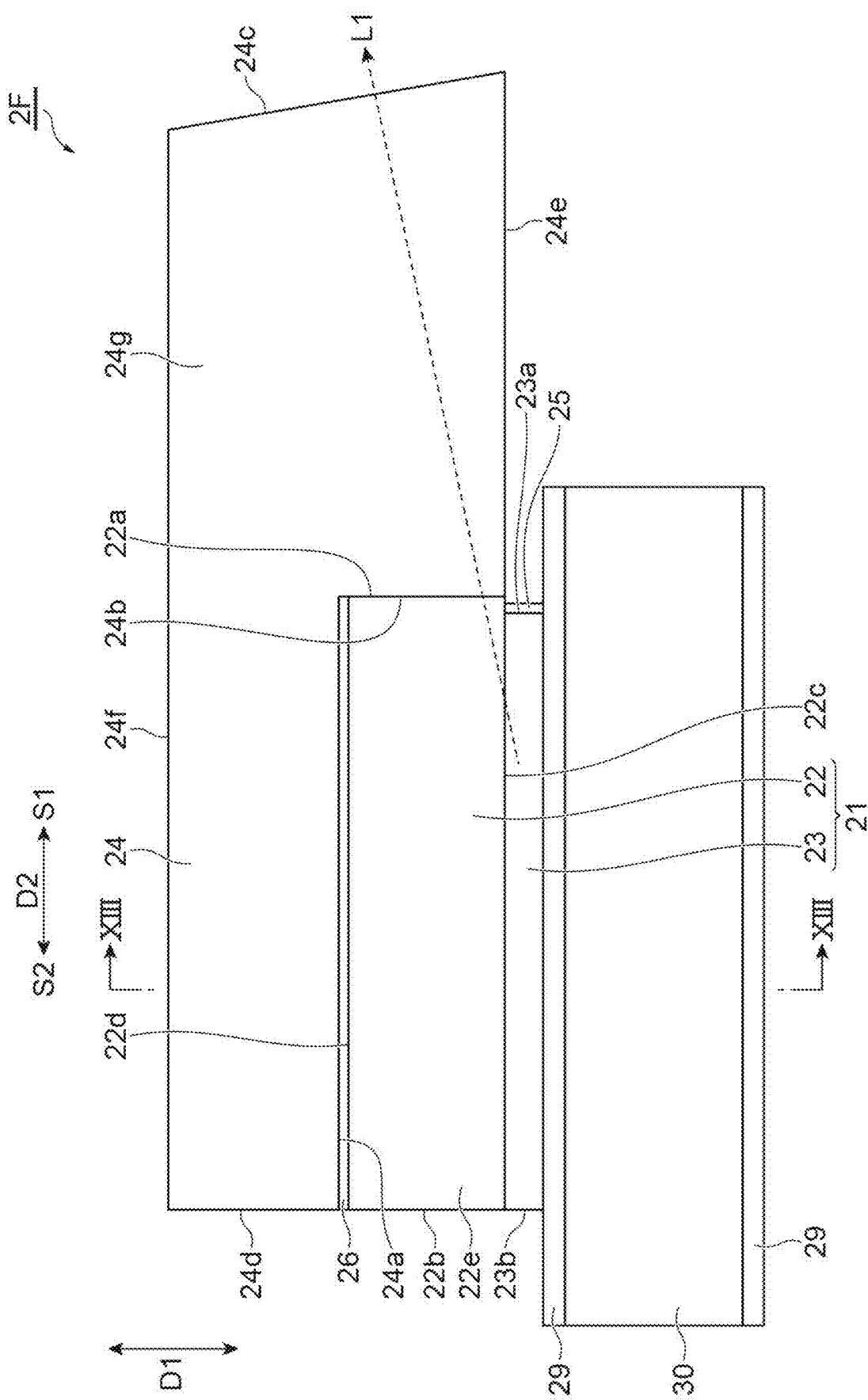

LASER MODULE

CROSS-REFERENCE TO RELATED APPLICATION

This application claims the benefit of priority from Japanese Patent Application No. 2022-053473, filed on Mar. 29, 2022, the entire contents of which are incorporated herein by reference.

TECHNICAL FIELD

The present disclosure relates to a laser module.

BACKGROUND

Conventionally, a difference frequency generation type terahertz quantum cascade laser (DFG-THz-QCL: Difference Frequency Generation THz-Quantum Cascade Laser) has been known. For example, Patent Document 1 (US Patent Application Publication No. 2015/0311665) discloses that an end surface (surface on a side at which terahertz wave is emitted) of a substrate constituting a terahertz quantum cascade laser is polished so as to be inclined with respect to an end surface of an active layer in order to avoid total reflection of a terahertz wave on the end surface of the substrate.

SUMMARY

However, since the process of polishing the end surface of the substrate as described above has a relatively high degree of difficulty, it may be a factor that reduces the productivity of the terahertz quantum cascade laser. In addition, in order to increase the extraction efficiency of the terahertz wave, it is conceivable to adopt a configuration in which an end surface of a polished substrate is brought into contact with a lens surface of a lens for outputting the terahertz wave. In this case, when a process of pressing the end surface of the substrate against the lens surface while positioning the end surface is performed, the substrate may be damaged.

Accordingly, it is an object of an aspect of the present disclosure to provide a laser module capable of improving productivity and preventing damage.

A laser module according to one aspect of the present disclosure includes a quantum cascade laser element and a support member. The quantum cascade laser element includes: a substrate; a first clad layer provided on the substrate; an active layer provided on an opposite side of the first clad layer from the substrate and configured to generate a terahertz wave having a difference frequency between a first frequency and a second frequency; and a second clad layer provided on an opposite side of the active layer from the first clad layer. The support member is configured to support the substrate of the quantum cascade laser element and propagate the terahertz wave. The quantum cascade laser element includes: a first end surface located on a first side in a second direction orthogonal to a first direction that is a stacking direction of the substrate, the first clad layer, the active layer, and the second clad layer; and a second end surface located on a second side opposite to the first side in the second direction. The substrate includes: a first substrate-surface that constitutes a part of the first end surface and extends along the first direction and along a third direction which is orthogonal to the first direction and the second direction; a second substrate-surface that constitutes a part of the second end surface; a third substrate-surface facing the active layer in the first direction; and a fourth substrate-surface located on an opposite side from the third substrate-surface in the first direction. The active layer includes: a first active-layer-surface that constitutes a part of the first end surface and constitutes a resonator for oscillating light of the first frequency and light of the second frequency; and a second active-layer-surface that constitutes a part of the second end surface. The support member includes: a first portion including a first surface facing at least a portion of the fourth substrate-surface; and a second portion including: a second surface connected to the first surface and facing at least a portion of the first substrate-surface; and a third surface located on an opposite side from the second surface in the second direction. At least a portion of the terahertz wave generated in the active layer is incident on the second surface of the support member through the substrate and is emitted from the third surface through an inside of the second portion.

The laser module includes the support member that supports the substrate of the quantum cascade laser element. At least a part of the terahertz wave generated in the active layer is emitted from the third surface through the inside of the second portion of the support member. Here, if a configuration in which the terahertz wave is directly output from the first substrate-surface of the substrate to the outside (for example, the lens) is adopted, it is necessary to form a polished surface inclined with respect to a plane along the first direction and the third direction on the first substrate-surface in order to increase extraction efficiency of the terahertz wave. Since the process of forming such a polished surface is relatively difficult, the productivity of the quantum cascade laser element may be reduced. Further, the substrate may be damaged when the polished surface formed in this manner is brought into contact with the lens. Meanwhile, in the laser module, since the terahertz wave is output to the outside through the support member (second portion), there is no need to form a polished surface on the first substrate-surface. In addition, by pressing the first substrate-surface against the second surface of the support member, it is possible to stably fix the substrate to the support member while appropriately protecting the first substrate-surface. Therefore, it is possible to prevent the lowering of productivity and the breakage of the substrate as described above.

The third surface may be inclined with respect to the second surface so as to approach the second surface from a side at which the third substrate-surface is located toward a side at which the fourth substrate-surface is located along the first direction. According to the above configuration, it is possible to reduce the incident angle of the terahertz wave with respect to the third surface (the interface between the third surface and the outside) compared to a case where the third surface is not inclined. Thus, total reflection and surface reflection of the terahertz wave at the third surface can be suppressed, and extraction efficiency of the terahertz wave to the outside can be increased.

The first active-layer-surface may be located to the second side of the first substrate-surface so as to be spaced apart from the second surface in the second direction. According to the above configuration, it is possible to prevent contact between the first active-layer-surface and the second surface of the support member, and thus it is possible to prevent a decrease in the oscillation efficiency of the light of the first frequency and the light of the second frequency caused by the contact. As a result, the output of the terahertz wave generated by the difference frequency between the first frequency and the second frequency can be increased.

The laser module may further include a reflection film provided to cover the first active-layer-surface and improve reflectivity of the light of the first frequency and the light of the second frequency. According to the above configuration, it is possible to improve the oscillation efficiency of the light of the first frequency and the light of the second frequency in the active layer. As a result, the output of the terahertz wave generated by the difference frequency between the first frequency and the second frequency can be increased.

The first portion and the second portion may be integrally formed. According to the above configuration, by using the integrally formed support member, the quantum cascade laser element can be more stably supported.

The support member may include: a first member including the first portion; and a second member including the second portion and being a separate member from the first member. According to the above configuration, by constituting the first portion and the second portion as separate members (first member and second member), it is possible to easily manufacture the support member. For example, in a case where it is difficult to perform processing of a portion where the first surface and the second surface intersect with each other in the integrally formed support member with sufficient accuracy, by combining the first member and the second member, the accuracy of the portion can be easily obtained, and the manufacturing difficulty of the support member can be reduced.

The support member may be divided into the first member and the second member with a plane along the first surface as a boundary surface. Alternatively, the support member may be divided into the first member and the second member with a plane along the second surface as a boundary surface. According to the above configuration, it is possible to easily manufacture the support member by combining two members (first member and second member) each having a substantially rectangular parallelepiped shape.

The first member may be formed of a material having a thermal conductivity higher than that of the second member. According to the above configuration, the first member in contact with the bottom surface of the substrate (fourth substrate-surface opposite to the active layer side) of the support member is formed of a material having a higher heat conductivity than that of the second member. As a result, heat dissipation efficiency for heat generated in the quantum cascade laser element may be improved, and operation reliability of the quantum cascade laser element may be improved.

The first portion may include a fourth surface connected to the first surface and facing toward the second side in the second direction. The second substrate-surface, the second active-layer-surface, and the fourth surface may be formed to be flush with each other. According to the above configuration, when the light of the first frequency is oscillated by using the external resonator disposed at a position facing the second active-layer-surface, it is possible to prevent interference between the light emitted from the second active-layer-surface toward the external resonator and the support member. As a result, it is possible to avoid a decrease in coupling efficiency between the quantum cascade laser element and the external resonator. In addition, since the entire fourth substrate-surface and the support member (first portion) may be in surface contact with each other, heat dissipation efficiency for heat generated in the quantum cascade laser element may be improved.

The first portion may include a fourth surface connected to the first surface and facing toward the second side in the second direction. The second substrate-surface and the second active-layer-surface may protrude further toward the second side than the fourth surface. According to the above configuration, when the light of the first frequency is oscillated by using the external resonator disposed at a position facing the second active-layer-surface, it is possible to more reliably prevent interference between the light emitted from the second active-layer-surface toward the external resonator and the support member. As a result, it is possible to more reliably avoid a decrease in coupling efficiency between the quantum cascade laser element and the external resonator.

The first surface may be adhered to the fourth substrate-surface via an adhesive layer. The second surface may not be adhered to the first substrate-surface. According to the above configuration, it is possible to appropriately fix the quantum cascade laser element to the support member by adhering the first surface and the fourth substrate-surface to each other by the adhesive layer. In addition, it is possible to suppress the loss of the terahertz wave caused by interposing an adhesive layer having a different refractive index from the support member between the first substrate-surface and the second surface.

The first surface may be adhered to the fourth substrate-surface via a first adhesive layer. The second surface may be adhered to the first substrate-surface via a second adhesive layer. The second adhesive layer may have substantially the same refractive index as that of the second portion of the support member. According to the above configuration, it is possible to more stably fix the substrate to the support member compared to a case in which an adhesive layer (second adhesive layer) is not provided between the first substrate-surface and the second surface. In addition, by providing the second adhesive layer having substantially the same refractive index as that of the second portion between the second surface and the first substrate-surface, it is possible to suppress loss of the terahertz wave that may occur when an adhesive layer having a refractive index relatively largely different from that of the second portion is disposed between the second surface and the first substrate-surface. In addition, since it is possible to suppress an air layer from being interposed between the first substrate-surface and the second surface, it is possible to suppress a loss of the terahertz wave caused by the air layer.

The second portion may have substantially the same refractive index as that of the substrate. According to the above configuration, at the interface between the support member and the substrate, reflection of the terahertz wave, which travels from the substrate toward the support member, toward the substrate side can be suppressed, and propagation efficiency of the terahertz wave from the substrate toward the support member can be improved.

The laser module may further include a first lens that is disposed at a position facing the third surface and configured to transmit the terahertz wave propagated inside the support member. According to the above configuration, by guiding the terahertz wave emitted from the third surface to the first lens, it is possible to increase extraction efficiency of the terahertz wave.

A lens surface of the first lens facing the support member may be in contact with the third surface. The first lens may have substantially the same refractive index as that of the second portion. According to the above configuration, the reflection of the terahertz wave at the interface between the third surface of the support member and the lens surface of the first lens can be suppressed, and the extraction efficiency of the terahertz wave can be further improved.

When viewed from the third direction, the support member may not overlap with the quantum cascade laser element.

According to the above configuration, it is possible to secure flexibility of arrangement of the quantum cascade laser element in the third direction with respect to the support member.

The support member may include a wall portion erected on the first surface so as to face at least a part of the substrate on one side of the quantum cascade laser element in the third direction. According to the above configuration, when the quantum cascade laser element is fixed to the support member, the positioning of the quantum cascade laser element in the third direction can be easily performed by pressing the substrate of the quantum cascade laser element against the wall portion. In addition, since the contact areas between the substrate and the support member can be increased by contact areas between the wall portion and the substrate as compared to a case where the wall portion is not provided, the heat dissipation efficiency for heat generated in the quantum cascade laser element can be improved.

The laser module may further include: a holder configured to hold the quantum cascade laser element and the support member; and a package that accommodates the quantum cascade laser element, the support member, and the holder. According to the above configuration, an unit including the quantum cascade laser element and the support member is accommodated in the package, so that the unit can be prevented from being damaged and a highly reliable laser module can be obtained.

The laser module may further include: a first lens that is disposed at a position facing the third surface and configured to transmit the terahertz wave propagated inside the support member; a movable diffraction grating constituting an external resonator for the light of the first frequency; and a second lens that is disposed between the quantum cascade laser element and the movable diffraction grating, and configured to transmit output light emitted from the second active-layer-surface and light returning from the movable diffraction grating to the quantum cascade laser element. The package may further accommodate the movable diffraction grating and the second lens. An optical path between the first lens and the movable diffraction grating may be disposed inside the package. According to the above configuration, in a configuration in which the light of the first frequency is oscillated using the external resonator, a highly reliable laser module can be obtained by accommodating the external resonator in the package.

According to an aspect of the present disclosure, it is possible to provide a laser module capable of improving productivity and preventing damage.

BRIEF DESCRIPTION OF THE DRAWINGS

FIG. 9A is a side view of a QCL unit according to a first modification example. FIG. 9B is a side view of a QCL unit according to a second modification example.

FIG. 10A is a side view of a QCL unit according to a third modification example. FIG. 10B is a side view of a QCL unit according to a fourth modification example.

FIG. 12 is a side view of a QCL unit according to a sixth modification example.

DETAILED DESCRIPTION

Figure 1:
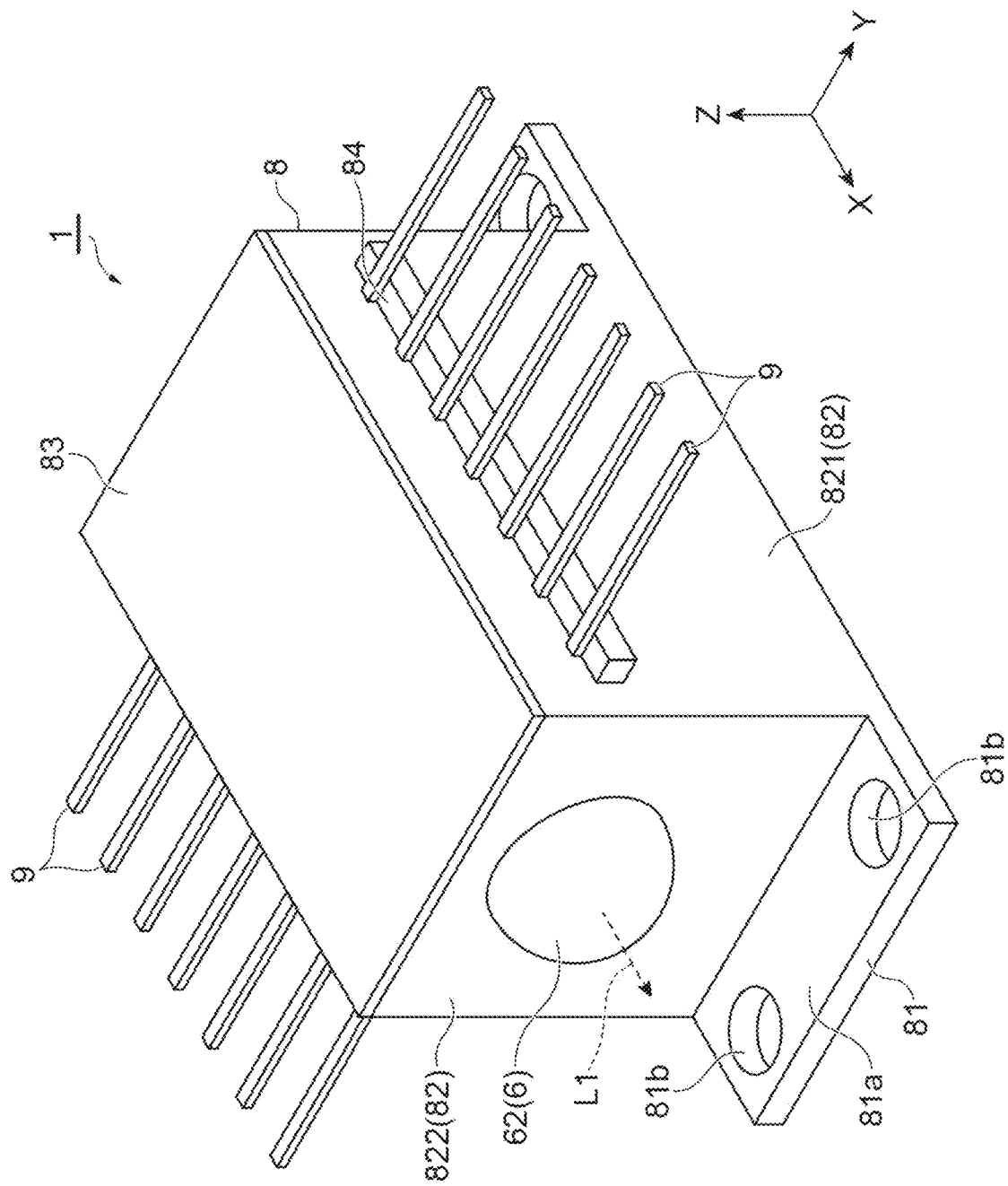
FIG. 1 is a perspective view of a laser module according to an embodiment.

Hereinafter, an embodiment of the present disclosure will be described in detail with reference to the drawings. In the following description, the same or corresponding elements are denoted by the same reference numerals, and redundant description is omitted. Further, terms such as "upper" and "lower" are used for convenience based on the state shown in the drawings. In the drawings, some features of the embodiments are exaggerated for easy understanding. Therefore, the dimensional ratio of each part in the drawings may be different from the actual dimensional ratio.

A laser module 1 according to the present embodiment will be described with reference to FIGS. 1 to 8. The laser module 1 is, for example, a compact terahertz light source module having a size equal to or smaller than a hand-top size. As an example, the laser module 1 is configured to be a wavelength-variable light source and can operate in a single mode at room temperature by using a quantum cascade laser element 21 (hereinafter referred to as "QCL element 21") which is a difference frequency generation type terahertz quantum cascade laser (DFG-THz-QCL). The laser module 1 includes a QCL unit 2 including the QCL element 21 and a support member 24, a diffraction grating unit 3, a lens 4 (second lens), a lens holder 5, a lens 6 (first lens), a holder 7, and a package 8.

The package 8 is a housing that airtightly accommodates the QCL unit 2, the diffraction grating unit 3, the lens 4, the lens holder 5, and the holder 7. In the package 8, an optical path between the light incident surface 61 of the lens 6 and the movable diffraction grating 31 (diffraction grating unit 3) is disposed. Note that members other than those described above (for example, a temperature sensor for measuring the temperature inside the package 8, a temperature control element such as a Peltier element, or the like) may be disposed inside the package 8.

Figure 2:
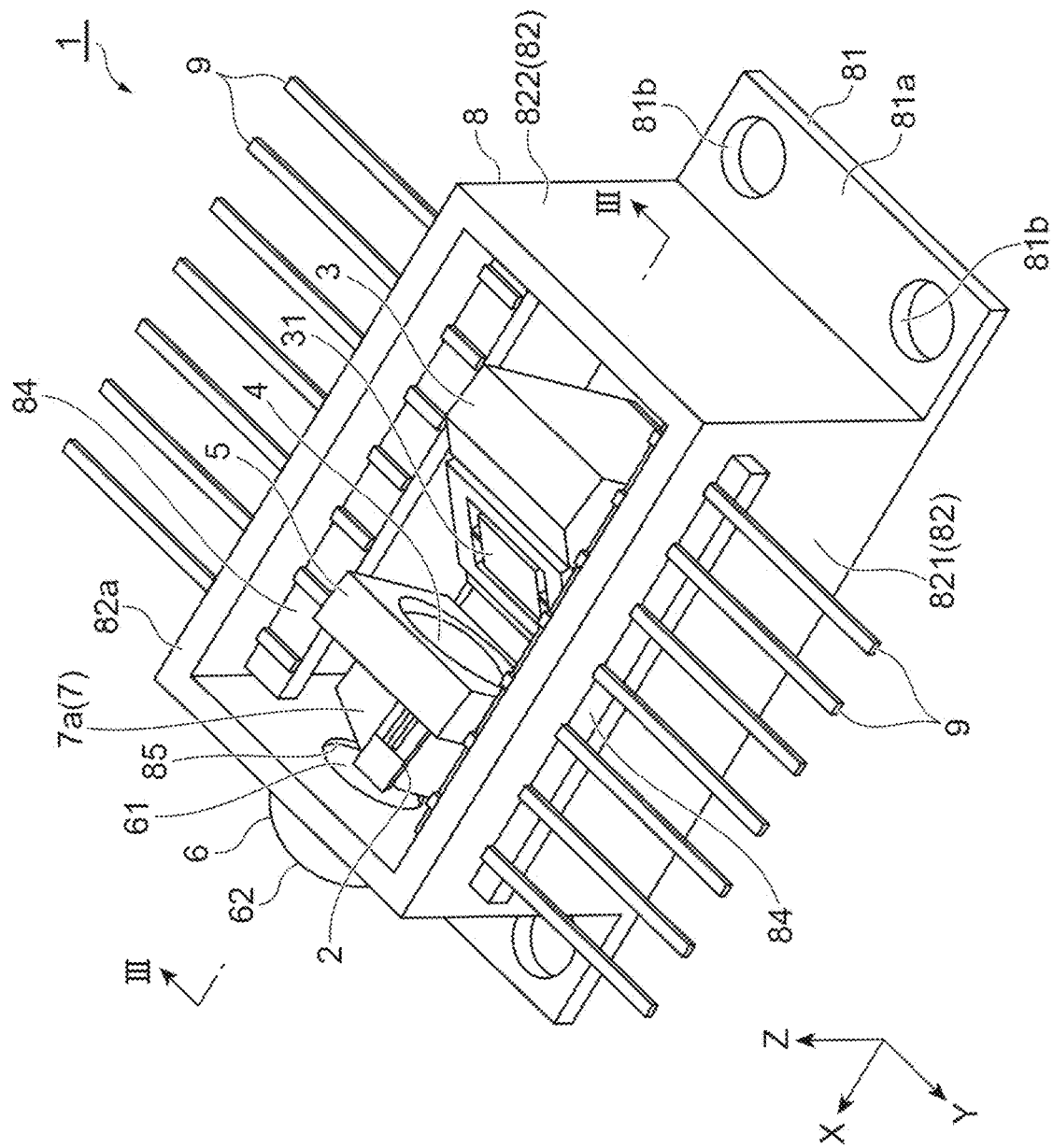
FIG. 2 is a perspective view of the laser module viewed from an angle different from that in FIG. 1.

In the present embodiment, as an example, the package 8 is a butterfly package. The package 8 includes a bottom wall 81, a side wall 82, and a top wall 83. In FIG. 2, the top wall 83 is not shown.

The bottom wall 81 is a rectangular plate-shaped member. The bottom wall 81 is formed of a metal material such as copper tungsten. The bottom wall 81 is a base member on which the holder 7 is mounted. In the present embodiment, the holder 7 is directly placed on the bottom wall 81, but another member such as a heat dissipation member (for example, a Peltier element) may be disposed between the bottom wall 81 and the holder 7. That is, the holder 7 may be disposed on the bottom wall 81 via other members. In the present specification, for convenience, a longitudinal direction of the bottom wall 81 is represented as an X-axis direction, a lateral direction of the bottom wall 81 is represented as a Y-axis direction, and a direction perpendicular to the bottom wall 81 (that is, a direction orthogonal to the X-axis direction and the Y-axis direction) is represented as a Z-axis direction.

The side wall 82 is erected on the bottom wall 81. The side wall 82 is formed in an annular shape so as to surround the internal space in which the QCL unit 2 and the like are accommodated when viewed from the Z-axis direction. In the present embodiment, the side wall 82 is formed in a rectangular tubular shape. The side wall 82 is formed of a metal material such as Kovar. The side wall 82 is, for example, a Kovar frame plated with Ni/Au. In the present embodiment, the side wall 82 is provided at a central portion in the longitudinal direction (X-axis direction) of the bottom wall 81. The width of the side wall 82 in the lateral direction (Y-axis direction) is equal to the width of the bottom wall 81 in the lateral direction, and the width of the side wall 82 in the longitudinal direction (X-axis direction) is shorter than the width of the bottom wall 81 in the longitudinal direction. That is, protruding portions 81a are formed on both sides of the bottom wall 81 in the longitudinal direction so as to protrude outward from the side wall 82. A screw hole 81b for attaching the package 8 (bottom wall 81) to another member is provided in portions corresponding to four corners of the bottom wall 81 in the protruding portion 81b.

The top wall 83 is a member that closes the opening of the side wall 82 on the side opposite to the bottom wall 81 side. The top wall 83 has a rectangular plate shape. The outer shape (width in the longitudinal direction and the lateral direction) of the top wall 83 viewed from the Z-axis direction substantially matches the outer shape of the side wall 82. The top wall 83 is formed of, for example, the same metal material (for example, Kovar or the like) as that of the side wall 82. The top wall 83 is airtightly joined to an end portion 82a of the side wall 82 on the side opposite to the bottom wall 81 side by, for example, seam welding or the like in a state where the inside of the package 8 is evacuated or nitrogen-replaced.

In a pair of side walls 821 extending along the longitudinal direction (X-axis direction) of the side wall 82 (i.e., portions intersecting the lateral direction (Y-axis direction)), a plurality of lead terminals 9 (in the present embodiment, seven on each side in the lateral direction, i.e., fourteen in total) for supplying current to members such as the QCL element 21 housed in the package 8 are inserted. Each lead terminal 9 is a flat plate-shaped conductive member extending in the Y-axis direction.

In addition, each of the pair of side walls 821 is provided with a protruding wall 84 that protrudes from both the outer surface side (the surface on the outer side of the package 8) and the inner surface side (the surface on the inner side of the package 8) of the side wall 821. The protruding wall 84 is an eaves-like member provided so as to extend along the X-axis direction above (on the top wall 83 side of) the center position of the side wall 821 in the Z-axis direction. The lead terminals 9 are arranged on the upper surface of the protruding wall 84 at substantially equal intervals along the X-axis direction.

A portion of the lead terminal 9 located outside the package 8 is electrically connected to a driving power source of the QCL element 21, a driving power source of the movable diffraction grating 31, or the like. On the other hand, a portion of the lead terminal 9 located inside the package 8 functions as an electrode terminal for supplying power to each member (for example, the QCL element 21, the movable diffraction grating 31, or the like) inside the package 8. That is, the electrode terminal and each member in the package 8 are electrically connected to each other via a conductive wire (not shown), so that electric power is supplied from an external power source to each member via the lead terminal 9 and the wire. In addition, when the temperature sensor, the temperature control element, and the like are disposed in the package 8, these members are also electrically connected to the electrode terminals.

A through hole 85 penetrating in a direction perpendicular to the side wall 822 (that is, the X-axis direction) is provided in the side wall 822 facing one end surface 21a of the QCL element 21 among a pair of side walls 822 (that is, portions intersecting the longitudinal direction (X-axis direction)) extending along the lateral direction (Y-axis direction) of the side wall 82. The lens 6 is attached to the through hole 85.

[Configuration of QCL Unit]

As illustrated in FIGS. 3 to 7, the QCL unit 2 includes a QCL element 21 and a support member 24. The QCL element 21 includes a substrate 22 and a semiconductor layer 23. In FIGS. 3 to 7, the direction D1 (first direction) is a stacking direction of the QCL element 21 (stacking direction of a substrate 22, a lower clad layer 231, an active layer 232, and an upper clad layer 233 to be described later). That is, the direction D1 is the height direction of the QCL element 21. The direction D2 (second direction) is a direction orthogonal to the direction D1, and is a longitudinal direction of the QCL element 21 (a direction in which an end surfaces 21a and 21b described later face each other). The direction D3 (third direction) is a direction orthogonal to the direction D1 and the direction D2, and is a widthwise direction of the QCL element 21.

Figure 4:
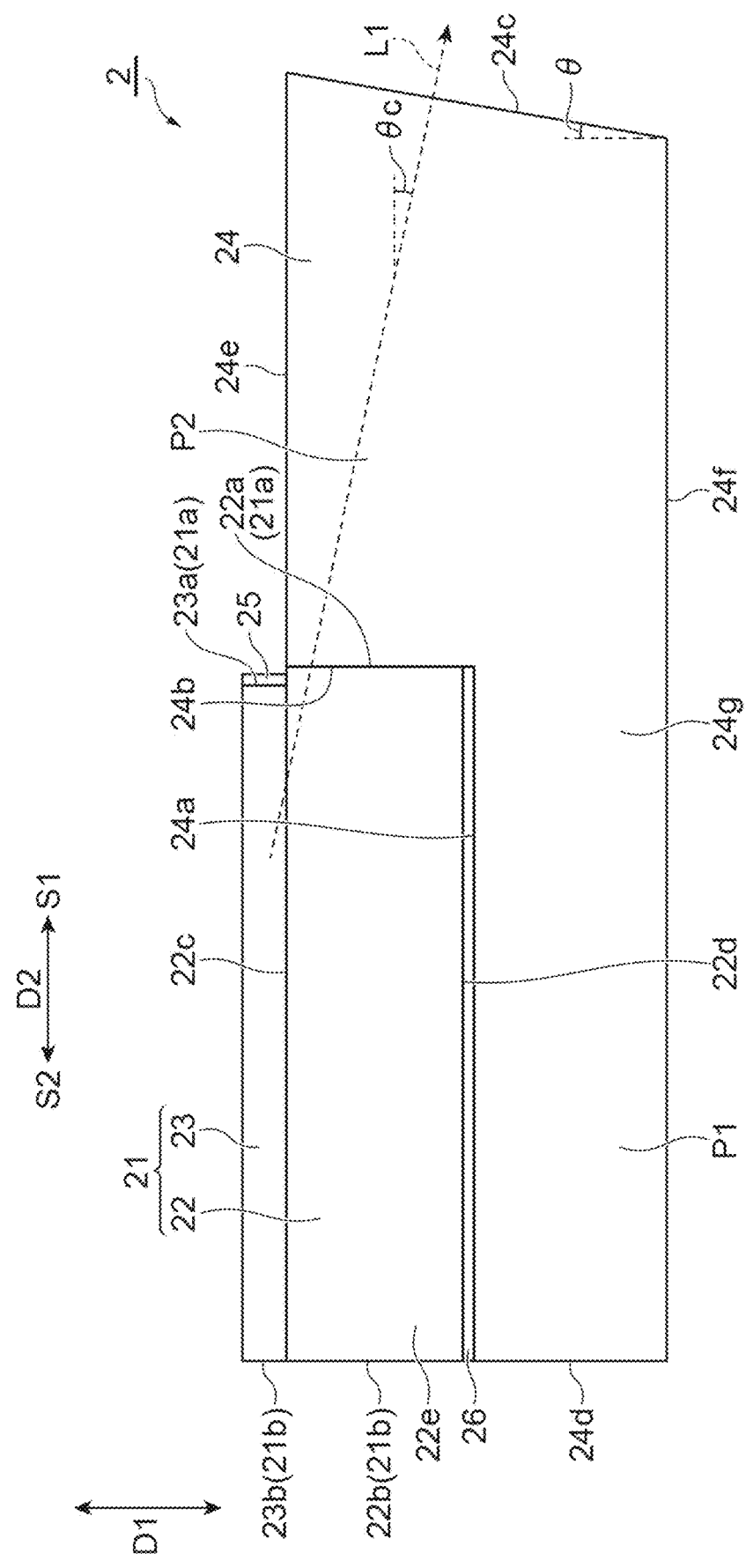
FIG. 4 is a side view of a QCL unit.
Figure 6:
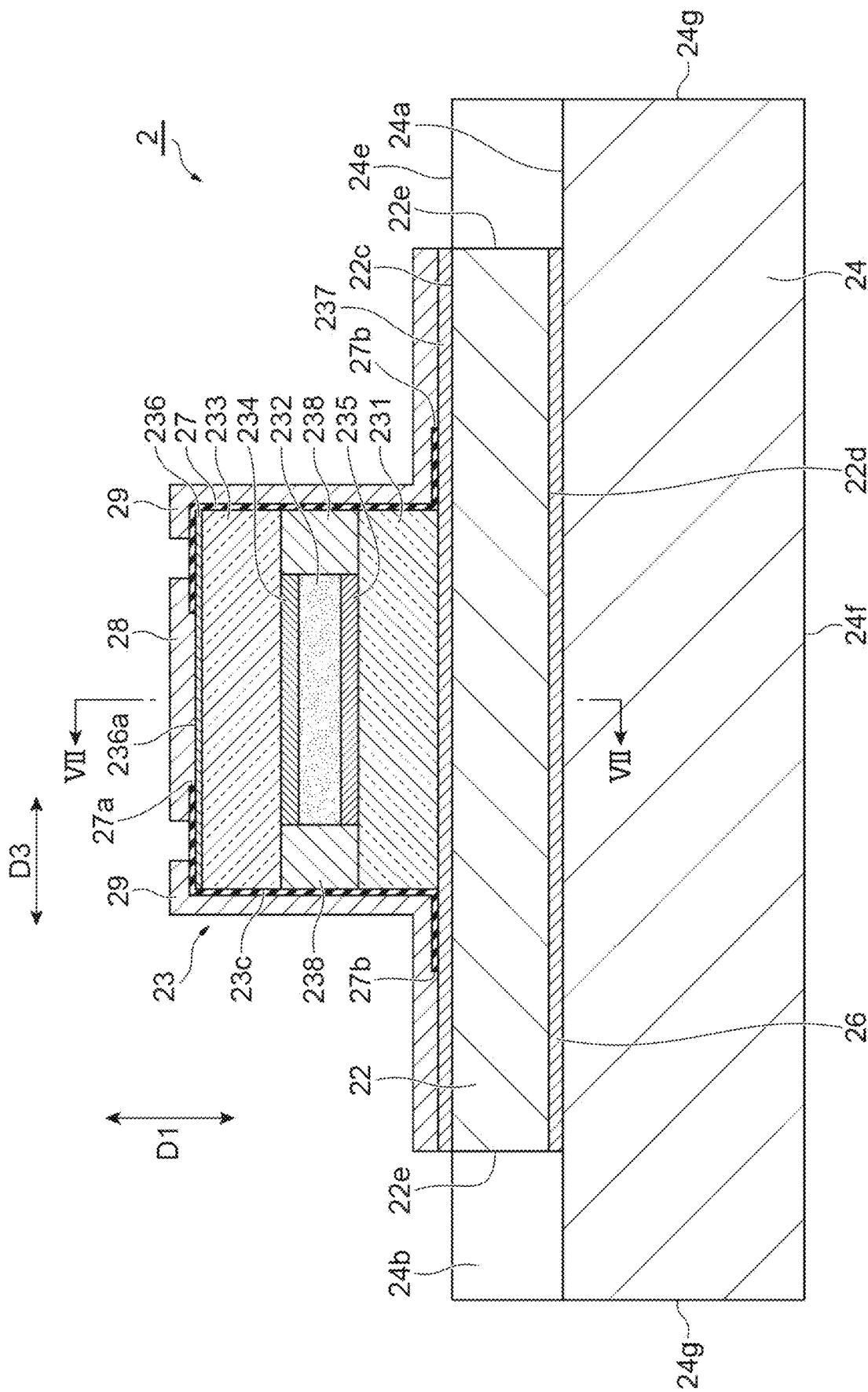
FIG. 6 is a cross-sectional view of the QCL unit taken along line VI-VI of FIG. 5.

The QCL element 21 is a terahertz light source configured to be capable of outputting a terahertz wave in a room temperature environment. The QCL element 21 has a rod shape. The QCL element 21 has an end surface 21a (first end surface) and an end surface 21b (second end surface) opposite to each other in the direction D2. As shown in FIG. 4, the end surface 21a is constituted by an end surface 22a of the substrate 22 and an end surface 23a of the semiconductor layer 23. The end surface 21b is constituted by an end surface 22b of the substrate 22 and an end surface 23b of the semiconductor layer 23. As shown in FIG. 6, the QCL element 21 can be formed as a ridge-stripe laser element by a general semiconductor process. The QCL element 21 is, for example, obtained by forming InGaAs/InAlAs on an InP substrate (substrate 22) by epitaxial growth.

The substrate 22 is, for example, a rectangular plate-shaped InP single-crystal substrate (semi-insulating substrate: high-resistance semiconductor substrate not doped with impurities). The length (length in the direction D2) of the substrate 22 is about several hundred μm to several mm. The width (length in the direction D3) of the substrate 22 is about several hundred μm to several mm. The thickness (length in the direction D1) of the substrate 22 is about several hundred μm. In the present embodiment, as an example, the length of the substrate 22 is approximately 3 mm, the width of the substrate 22 is approximately 1 mm, and the thickness of the substrate 22 is approximately 500 μm. The terahertz wave generated by the difference frequency generation inside the active layer 232 is mainly propagated to the support member 24 via the substrate 22. From the viewpoint of increasing the extraction efficiency of terahertz waves from the substrate 22 to the support member 24, the substrate 22 is preferably a semi-insulating substrate as described above or a substrate having a carrier density of $1 \times 10^{17}$ cm$^{-3}$ or less.

Figure 5:
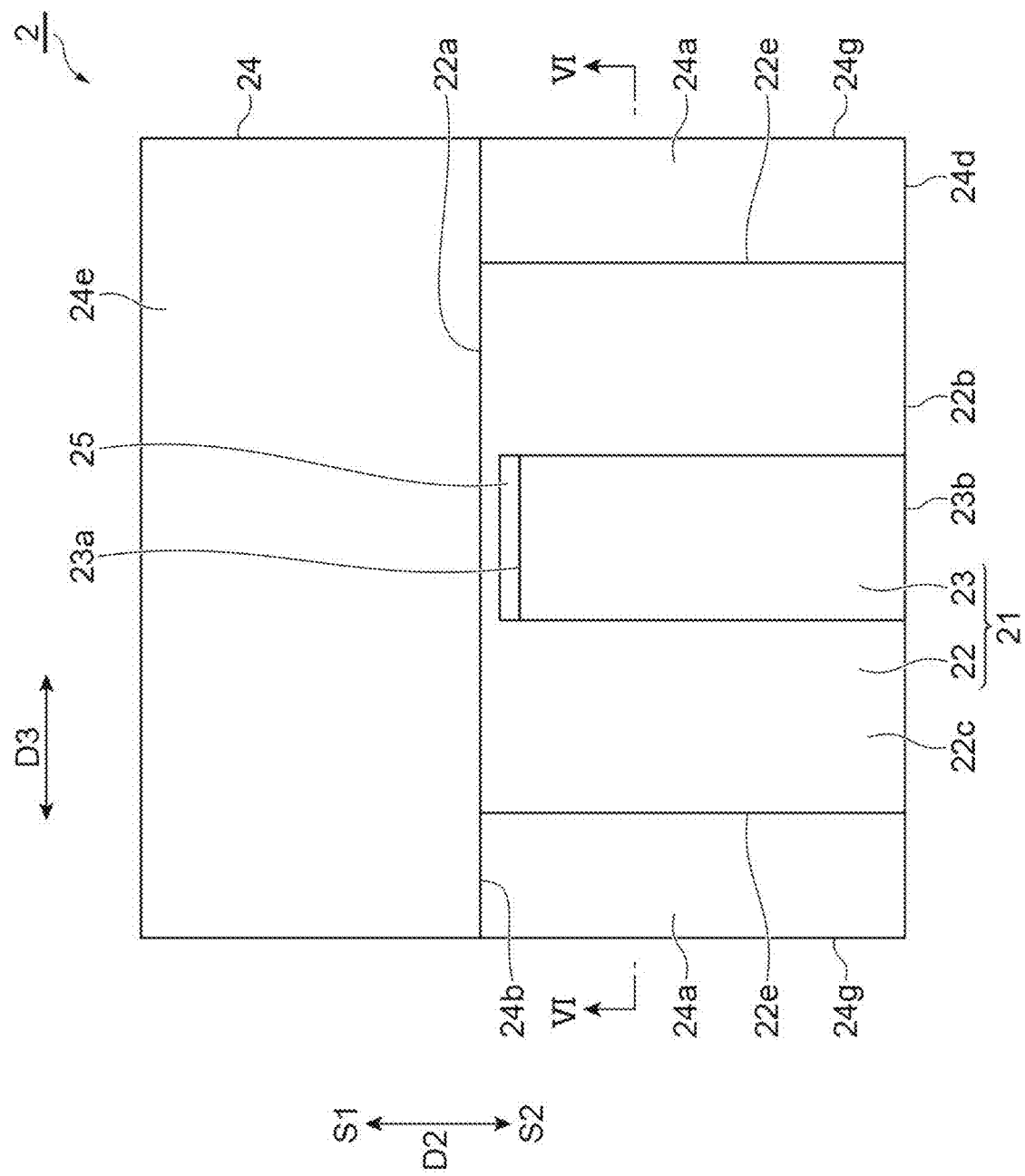
FIG. 5 is a plan view of the QCL unit.

As shown in FIGS. 4 and 5, the substrate 22 has end surfaces 22a to 22e.

The end surface 22a (first substrate-surface) is a surface constituting a part of the end surface 21a of the QCL element 21, and extends along the direction D1 and the direction D3. That is, the end surface 22a is a surface perpendicular to the direction D2. The end surface 22a is in surface contact with a surface 24b (second surface) of the support member 24 to be described later.

The end surface 22b (second substrate-surface) is a surface constituting a part of the end surface 21b of the QCL element 21. That is, the end surface 22b is located on the opposite side from the end surface 22a in the direction D2. Similar to the end surface 22a, the end surface 22b is a surface perpendicular to the direction D2.

The end surface 22c (third substrate-surface) is a surface facing the semiconductor layer 23 including the active layer 232 in the direction D1. The end surface 22c extends along the direction D2 and the direction D3. That is, the end surface 22c is a surface perpendicular to the direction D1.

The end surface 22d (fourth substrate-surface) is a surface located on the opposite side from the end surface 22c in the direction D1. Similar to the end surface 22c, the end surface 22d is a surface perpendicular to the direction D1. The end surface 22d is adhered to a surface 24a (first surface) of the support member 24 to be described later via an adhesive layer 26.

The pair of end surfaces 22e are side surfaces (surfaces facing the direction D3) of the substrate 22.

The semiconductor layer 23 is provided on the end surface 22c of the substrate 22. The thickness (length in the direction D1) of the semiconductor layer 23 is about 10 μm to 20 μm. The semiconductor layer 23 includes an end surface 23a constituting a part of the end surface 21a of the QCL element 21 and an end surface 23b constituting a part of the end surface 21b of the QCL element 21. The semiconductor layer 23 emits broadband light in a mid-infrared region (for example, 3 μm or more and 20 μm or less) from each of the end surfaces 23a and 23b. The end surfaces 23a and 23b are surfaces perpendicular to the direction D2. The end surfaces 23a and 23b are cleavage surfaces formed by cleavage, for example. The end surface 23a is a surface located in the first side S1 in the direction D2, and faces the lens 6. The end surface 23b is a surface located in the second side S2 opposite to the first side S1 in the direction D2, and faces the lens 4. The end surface 23b may be provided with a low-reflection coating having a reflectivity of 5% or less with respect to wavelength corresponding to the gain peak of the QCL element 21, for example. The QCL element 21 may have a structure in which a plurality of active layers having different center wavelengths different from each other are stacked or may have a structure including a single active layer in order to emit broadband light as described above.

Figure 7:
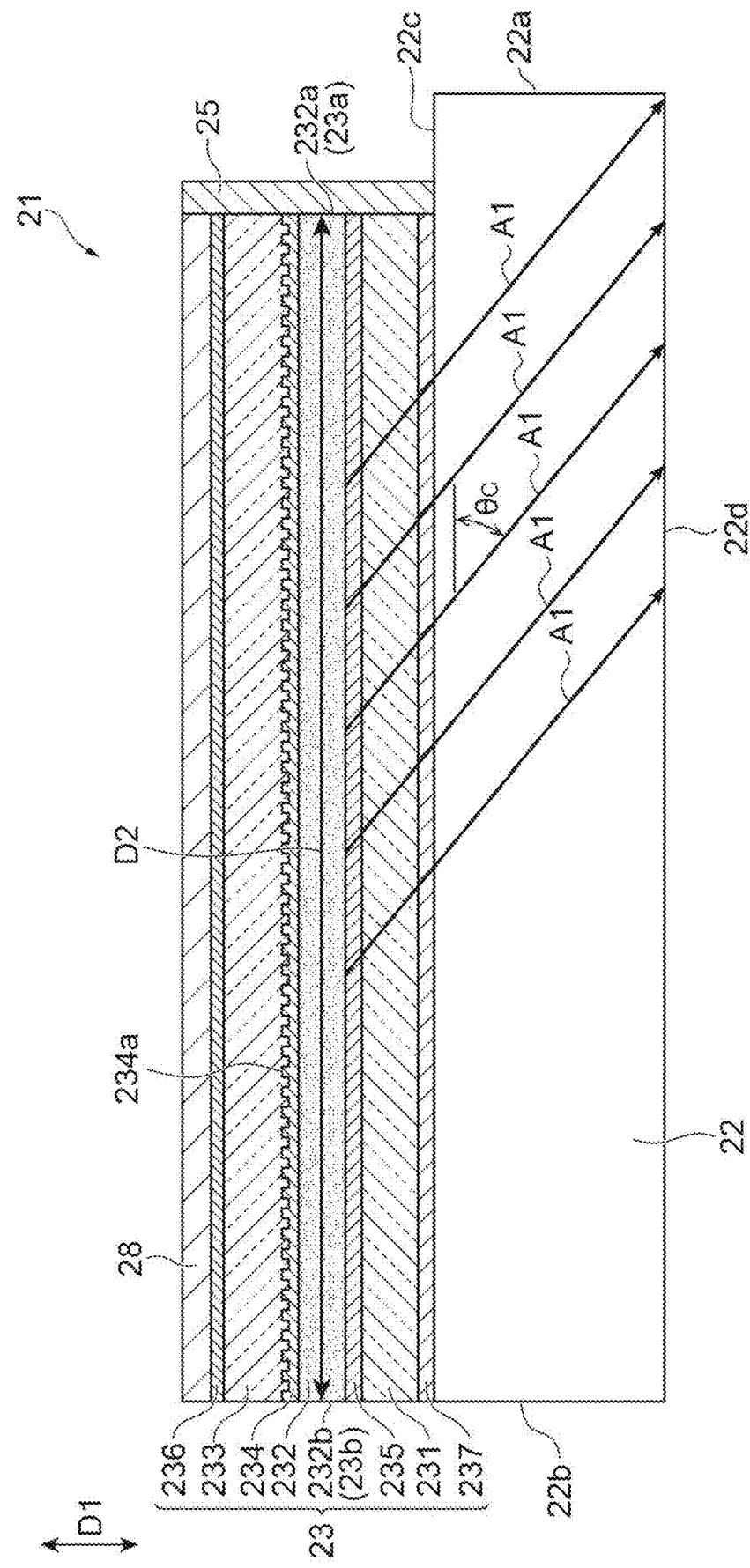
FIG. 7 is a cross-sectional view of a QCL element.

As shown in FIGS. 6 and 7, the semiconductor layer 23 includes a lower clad layer 231 (first clad layer), an active layer 232, and an upper clad layer 233 (second clad layer). In the present embodiment, the semiconductor layer 23 includes an upper guide layer 234, a lower guide layer 235, an upper contact layer 236, and a lower contact layer 237 in addition to the above.

From the end surface 22c of the substrate 22, the lower contact layer 237, the lower clad layer 231, the lower guide layer 235, the active layer 232, the upper guide layer 234, the upper clad layer 233, and the upper contact layer 236 are laminated in this order. The support layer 238 is provided between the lower clad layer 231 and the upper clad layer 233 on both sides (both sides in the direction D3) of the active layer 232, the upper guide layer 234, and the lower guide layer 235 formed in a ridge stripe shape. The lower contact layer 237 has a portion extending outward (outward in the direction D3) from the lower clad layer 231. In this embodiment, the end portion of the lower contact layer 237 in the direction D3 coincides with the end portion of the substrate 22 in the direction D3 (i.e., the position of the end surface 22e).

The lower contact layer 237 is, for example, a high-concentration Si-doped InGaAs layer (Si: $1.0 \times 10^{18}$/cm$^3$) with a thickness of about 400 nm, and is provided on the end surface 22c of the substrate 22.

The lower clad layer 231 is, for example, a Si-doped InP layer (Si: $1.5 \times 10^{16}$/cm$^3$) with a thickness of about 5 μm, and is provided on the lower contact layer 237. That is, the lower clad layer 231 is provided on the end surface 22c of the substrate 22 via the lower contact layer 237.

The lower guide layer 235 is, for example, a Si-doped InGaAs layer (Si: $1.5 \times 10^{16}$/cm$^3$) with a thickness of about 250 nm, and is provided on the lower clad layer 231.

The active layer 232 is a layer in which a quantum cascade structure is formed, and is provided on the lower guide layer 235. That is, the active layer 232 is provided on the opposite side of the lower clad layer 231 from the substrate 22. As shown in FIG. 7, the active layer 232 has an end surface 232a (first active-layer-surface) and an end surface 232b (second active-layer-surface) opposite to each other in the direction D2. The end surface 232a is a part of the end surface 23a of the semiconductor layer 23. That is, the end surface 232a is a part of the end surface 21a of the QCL element 21. The end surface 232b is a part of the end surface 23b of the semiconductor layer 23. That is, the end surface 232b is a part of the end surface 21b of the QCL element 21. As an example, the active layer 232 has a structure in which a plurality of InGaAs layers and InAlAs layers are alternately stacked along the direction D1.

The upper guide layer 234 is, for example, a Si-doped InGaAs layer (Si: $1.5 \times 10^{16}$/cm$^3$) with a thickness of about 450 nm, and is provided on the active layer 232.

The upper clad layer 233 is, for example, Si-doped InP layer (Si: $1.5 \times 10^{16}$/cm$^3$) with a thickness of about 5 μm, and is provided on the upper guide layer 234. That is, the upper clad layer 233 is provided on the opposite side of the active layer 232 from the lower clad layer 231.

The upper contact layer 236 is, for example, a high-concentration Si-doped InP layer (Si: $1.5 \times 10^{18}$/cm$^3$) with a thickness of about 15 nm, and is provided on the upper clad layer 233.

The support layer 238 is, for example, an Fe-doped InP layer.

As shown in FIG. 6, the insulating film 27 is formed so as to cover an upper surface 236a of the upper contact layer 236, the side surface 23c of the semiconductor layer 23 intersecting the direction D3, and a part of the lower contact layer 237. The insulating film 27 is formed of, for example, SiN. A contact hole 27a is formed in the insulating film 27 to expose a portion of the upper surface 236a of the upper contact layer 236. The contact hole 27a extends along the direction D2 so as to expose a central portion of the upper surface 236a in the direction D3. Further, in the direction D3, an end portion 27b of the insulating film 27 on the lower contact layer 237 is located inside the end portion of the lower contact layer 237. In other words, the upper surface of the lower contact layer 237 is exposed outside the end portion 27b of the insulating film 27.

The first electrode 28 is formed on the upper surface 236a of the upper contact layer 236. The first electrode 28 is electrically connected to a portion of the upper surface 236a of the upper contact layer 236 through the contact hole 27a.

The second electrode 29 is formed on the lower contact layer 237 so as to be in contact with a portion of the lower contact layer 237 exposed outside the end portion 27b of the insulating film 27. In the present embodiment, the second electrode 29 is formed so as to cover a part of the side surface and the upper surface of the semiconductor layer 23, but is not necessarily formed in this manner That is, the second electrode 29 may be formed so as to be electrically connected to at least the lower contact layer 237 and to be separated from the first electrode 28. According to the above configuration, it is possible to drive the QCL element 21 by causing current to flow from the second electrode 29 to the first electrode 28.

In order to obtain a terahertz wave of a single mode, it is necessary to simultaneously oscillate single modes (both are mid-infrared light) of two different wavelengths inside the QCL element 21. In the present embodiment, as an example, a single mode of one of the wavelengths (corresponding to the second frequency $\omega_2$) is oscillated by a diffraction grating (described later in detail) provided inside the QCL element 21, and a single mode of the other of the wavelengths (corresponding to the first frequency $\omega_1$ different from the second frequency $\omega_2$) is oscillated by an external resonator (described later in detail). In order to oscillate the single mode of the one of the wavelengths, a diffraction grating layer 234a (see FIG. 7) functioning as a distributed feedback (DFB) structure is formed in the upper guide layer 234 along the direction D2 (that is, a resonance direction) in which the end surfaces 232a and 232b face each other. The diffraction grating layer 234a oscillates, in a single mode, light having wavelength (wavelength corresponding to the second frequency $\omega_2$) that deviates from the wavelength corresponding to the gain peak of the QCL element 21. The QCL element 21 is in a state in which each of a single mode by DFB and a Fabry-Perot mode simultaneously has a gain. Each of the light of the first frequency $\omega_1$ (hereinafter referred to as "first light") and the light of the second frequency $\omega_2$ (hereinafter referred to as "second light") is mid-infrared light.

The end surfaces 232a and 232b of the active layer 232 constitute a resonator that oscillates the second light. On the other hand, the end surface 232a of the active layer 232 and the movable diffraction grating 31 as an external resonator constitute a resonator for oscillating the first light. As a result of oscillating the first light and the second light by such a configuration, the active layer 232 generates a terahertz wave having a difference frequency $\omega_3(=|\omega_1-\omega_2|)$ between the first frequency $\omega 1$ of the first light and the second frequency $\omega_2$ of the second light by difference frequency generation due to Cerenkov phase matching.

As shown in FIG. 7, the radiation direction A1 of the terahertz wave generated in this manner is inclined downward (toward the substrate 22) by a radiation angle $\theta_C$ (Cherenkov radiation angle) with respect to a direction (right direction in FIG. 7) from the end surface 232b toward the end surface 232a along the resonance direction (direction D2). More specifically, the terahertz wave generated by the active layer 232 propagates as a plane wave (that is, in phase) in the substrate 22 at a radiation angle $\theta_C$ expressed by the following Equation (1). In the following Equation (1), $n_{MIR}$ is a group index of refraction of the substrate 22 with respect to mid-infrared light, and $n_{THz}$ is an index of refraction of the substrate 22 with respect to terahertz wave.

$$\theta_C=\cos^{-1}(n_{MIR}/n_{THz}) \quad (1)$$

The support member 24 is a member that supports the substrate 22 of the QCL element 21 and propagates a terahertz wave. The support member 24 is formed of, for example, silicon (for example, high resistivity float zone silicon (HRFZ-Si) or the like). However, the support member 24 is not limited to silicon. The support member 24 is preferably formed of a material having substantially the same refractive index as that of the substrate 22 from the viewpoint of suppressing the terahertz wave from being reflected to the substrate 22 at the interface between the support member 24 and the substrate 22.

As shown in FIGS. 4 to 6, in the present embodiment, the support member 24 is wider than the QCL element 21 in the direction D3. Further, the support member 24 is formed in a substantially L shape so as to support the end surfaces 22a and 22d of the substrate 22 when viewed from the direction D3. The support member 24 includes the surfaces 24a to 24g.

The surface 24a (first surface) is a surface that faces at least a portion of the end surface 22d of the substrate 22. The surface 24a is a surface perpendicular to the direction D1. As shown in FIGS. 4 and 5, in the present embodiment, the surface 24a faces the entire end surface 22d. More specifically, the width of the surface 24a (length in the direction D3) is larger than the width of the end surface 22d, and the substrate 22 is disposed in the central portion of the surface 24a in the direction D3. The width of the surface 24a is, for example, about 3 mm. The length of the surface 24a (length in the direction D2) is equal to the length of the end surface 22d, and is, for example, about 3 mm.

The surface 24b (second surface) is a surface that is connected to the surface 24a and faces at least a portion of the end surface 22a of the substrate 22. More specifically, the surface 24b is connected to an end portion of the surface 24a on the first side S1 in the direction D2 and extends perpendicular to the surface 24a. That is, the surface 24b is a surface perpendicular to the direction D2.

The surface 24c (third surface) is a surface located on the opposite side from the surface 24b in the direction D2. As shown in FIG. 4, the surface 24c is inclined at an inclination angle $\theta$ with respect to the surface 24b so as to approach the surface 24b from the end surface 22c toward the end surface 22d along the direction D1 (that is, toward the down-ward direction in FIG. 4).

The surface 24d (fourth surface) is a surface that is connected to the surface 24a and faces toward the second side S2 in the direction D2. More specifically, the surface 24d is connected to an end portion of the surface 24a on the second side S2 in the direction D2 and extends perpendicular to the surface 24a. That is, the surface 24d is a surface perpendicular to the direction D2.

The surface 24e is a surface connecting an upper end portion of the surface 24b and an upper end portion of the surface 24c. The surface 24e is a surface perpendicular to the direction D1. In the present embodiment, as an example, the surface 24e is formed substantially flush with the end surface 22c of the substrate 22 placed on the surface 24a.

The surface 24f is a surface located on the side opposite to the surfaces 24a and 24e in the direction D1. The surface 24f is a surface connecting the lower end portion of the surface 24c and the lower end portion of the surface 24d. The surface 24f is a surface perpendicular to the direction D1.

The pair of surfaces 24g are side surfaces of the support member 24 (that is, surfaces facing toward the direction D3).

The length of the support member 24 in the direction D2 (i.e., the distance from the surface 24c to the surface 24d along the direction D2) is, for example, about 4 mm to 5 mm. The length of the support member 24 in the direction D1 (i.e., the distance from the surface 24e to the surface 24f along the direction D1) is, for example, about 1 mm. The length of the support member 24 in the direction D3 (i.e., the distance between the pair of surfaces 24g along the direction D3) is, for example, about 3 mm.

As described above, the support member 24 includes the first portion P1 facing the end surface 22d of the substrate 22 in the direction D1, and the second portion P2 facing the end surface 22a of the substrate 22 in the direction D2. The first portion P1 is a portion including the surface 24a and overlapping with the QCL element 21 in the direction D1. The second portion P2 is a portion including the surfaces 24b and 24c and overlapping with the QCL element 21 in the direction D2.

As shown in FIG. 4, the terahertz wave L1 generated by the active layer 232 (semiconductor layer 23) is radiated in a direction inclined by the radiation angle $\theta_C$ with respect to the direction D2. Therefore, at least a part of the terahertz wave L1 generated in the active layer 232 (semiconductor layer 23) is incident on the surface 24b of the support member 24 through the substrate 22, passes through the inside of the second portion P2, and is emitted from the surface 24c. As described above, the surface 24c is inclined at the inclination angle $\theta$. The inclination angle $\theta$ may be set such that the incident angle of the terahertz wave L1 to the surface 24c is smaller than that in a case where the surface 24c is not inclined (that is, a case where the inclination angle $\theta$ is 0 degrees). By configuring the surface 24c as described above, the incident angle of the terahertz wave L1 radiated in a direction inclined with respect to the direction from the second side S2 toward the first side Si in the direction D2 (that is, the radiation angle $\theta_C$) with respect to the surface 24c (the interface between the surface 24c and the outside) can be reduced compared to a case where the surface 24c is not inclined. As a result, total reflection and surface reflection of the terahertz wave L1 at the surface 24c can be suppressed, and extraction efficiency of the terahertz wave L1 to the outside can be increased. For example, by setting the inclination angle $\theta$ so as to substantially coincide with the radiation angle $\theta_C$ of the terahertz wave L1, the incident angle of the terahertz wave L1 with respect to the surface 24c can be brought close to 0 degrees, and the reflection of the terahertz wave at the surface 24c can be effectively suppressed. Here, since the substrate 22 is very thin, it is very difficult to form an inclined surface similar to the surface 24c by polishing the end surface 22a without damaging the substrate 22. On the other hand, it is relatively easy to form the inclined surface (surface 24c) as described above on the support member 24 thicker than the substrate 22 compared to an operation of polishing the end surface 22a of the substrate 22. As described above, according to the configuration in which the substrate 22 is fixed to the support member 24, the work for polishing the end surface 22a of the substrate 22 having a high degree of difficulty is unnecessary. In addition, by making the surface 24c an inclined surface as described above, it is possible to obtain the same effect as the effect conventionally obtained by making the end surface 22a of the substrate 22 an inclined surface (that is, suppression of reflection of a terahertz wave).

In the case where the surface 24c of the support member 24 is brought into contact with the lens 6 as in the present embodiment, the surface 24c does not necessarily need to be the inclined surface as described above (that is, the inclination angle $\theta$ may be 0 degrees). On the other hand, when the terahertz wave L1 is output directly to the outside from the surface 24c without using the lens 6, it is preferable that the surface 24c be an inclined surface as described above from the viewpoint of increasing the extraction efficiency of the terahertz wave.

In the present embodiment, since the end surface 22c of the substrate 22 is formed so as to be substantially flush with the surface 24e of the support member 24, even if the end surface 232a (end surface 23a) is flush with the end surface 22a of the substrate 22, the end surface 232a does not come into contact with the surface 24b of the support member 24. According to the above-described configuration, it is possible to prevent contact between the end surface 232a (end surface 23a) and the surface 24b of the support member 24, and thus to prevent a decrease in the oscillation efficiency of the first light and the second light (that is, a decrease in the function of the end surface 232a as a resonator) due to the contact.

As shown in FIGS. 4 and 5, the end surface 232a of the active layer 232 (in the present embodiment, the end surface 23a of the semiconductor layer 23) is located toward the second side S2 than the end surface 22a of the substrate 22 so as to be spaced apart from the surface 24b of the support member 24 in the direction D2. According to the above-described configuration, it is possible to prevent contact between the end surface 232a (end surface 23a) and the surface 24b of the support member 24, and thus to prevent a decrease in the oscillation efficiency of the first light and the second light (that is, a decrease in the function of the end surface 232a as a resonator) due to the contact. As a result, the output of the terahertz wave L1 generated by the difference frequency between the first frequency $\omega_1$ and the second frequency $\omega_2$ can be increased. As described above, in the present embodiment, since the end surface 22c of the substrate 22 is formed to be substantially flush with the surface 24e of the support member 24, even if the end surface 232a (end surface 23a) is flush with the end surface 22a of the substrate 22, the end surface 232a does not come into contact with the surface 24b of the support member 24. However, the surface 24e may be located slightly upper than the end surface 22c due to a manufacturing error or the like. In addition, there may be a case where the support member 24 is formed so that the surface 24e is positioned above the end surface 22c in order to further strengthen the support for the substrate 22 by the support member 24. According to the configuration in which the end surface 232a (end surface 23a) is set back to the second side S2 rather than the end surface 22a of the substrate 22 as described above, it is possible to reliably prevent contact between the end surface 232a and the surface 24b even in the above-described case. In addition, in a case where a reflection film 25 described later is provided on the end surface 232a as in the present embodiment, interference between the reflection film 25 and the surface 24b can be prevented by setting back the end surface 232a to the second side S2 rather than the end surface 22a.

As shown in FIGS. 4, 5, and 7, the laser module 1 includes the reflection film 25 provided so as to cover the end surface 232a of the active layer 232 (in this embodiment, the end surface 23a of the semiconductor layer 23) and configured to improve the reflectivity of the first light and the second light. The reflection film 25 is formed of, for example, gold (Au). That is, high reflection (HR) coating is applied to the end surface 232a of the active layer 232. According to the above configuration, since it is possible to increase the amount of light reflected to the end surface 232b side among the mid-infrared light (the first light and the second light) incident on the end surface 232a from the end surface 232b side, it is possible to improve the oscillation efficiency of the first light and the second light in the active layer 232. As a result, the output of the terahertz wave L1 generated by the difference frequency between the first frequency $\omega_1$ and the second frequency $\varphi 2$ can be increased.

As shown in FIG. 4, the first portion P1 and the second portion P2 are integrally formed. According to the above configuration, by using the integrally formed support member 24, the QCL element 21 can be supported more stably.

As shown in FIG. 4, the first portion P1 includes the surface 24d. In addition, the end surface 22b of the substrate 22, the end surface 232b of the active layer 232 (in this embodiment, the end surface 23b of the semiconductor layer 23), and the surface 24d are formed to be flush with each other. According to the above configuration, when the first light is oscillated by using the external resonator (movable diffraction grating 31 to be described later) disposed at a position facing the end surface 232b, it is possible to prevent interference between the light emitted from the end surface 232b toward the external resonator (light radiated at a relatively large spread angle) and the support member 24. As a result, it is possible to avoid a decrease in coupling efficiency between the QCL element 21 and the external resonator. In addition, since the entire end surface 22d of the substrate 22 and the support member 24 (first portion P1) may be in surface contact with each other, heat dissipation efficiency for heat generated in the QCL element 21 may be improved. That is, heat generated in the QCL element 21 can be appropriately released from the substrate 22 to the support member 24.

As shown in FIG. 4, the surface 24a of the support member 24 is adhered to the end surface 22d of the substrate 22 via the adhesive layer 26. The adhesive layer 26 is, for example, solder, resin, or the like. On the other hand, the surface 24b of the support member 24 is not adhered to the end surface 22a of the substrate 22. For example, the surface 24b is in directly surface contact with the end surface 22a without an adhesive layer therebetween. According to the above configuration, it is possible to appropriately fix the QCL element 21 to the support member 24 by adhering the surface 24a and the end surface 22d by the adhesive layer 26. In addition, it is possible to suppress the loss of the terahertz wave L1 caused by interposing the adhesive layer having a refractive index different from that of the support member 24 (second portion P2) between the end surface 22a and the surface 24b.

The second portion P2 has substantially the same refractive index as that of the substrate 22. In the present embodiment, since the support member 24 is integrally formed, the entire support member 24 has substantially the same refractive index as that of the substrate 22. According to the above configuration, at the interface between the support member 24 and the substrate 22, it is possible to suppress reflection of the terahertz wave L1 from the substrate 22 toward the support member 24 toward the substrate 22 side, and it is possible to improve propagation efficiency of the terahertz wave L1 from the substrate 22 to the support member 24. Note that "substantially the same refractive index" means that the difference in refractive index is equal to or less than "0.3".

As shown in FIGS. 4 and 6, when viewed from the direction D3, the support member 24 does not overlap with the QCL element 21. That is, on the surface 24a of the support member 24, a portion (for example, a wall portion) overlapping with the QCL element 21 is not provided on both sides of the QCL element 21 in the direction D3. According to the above configuration, it is possible to secure flexibility of arrangement of the QCL element 21 in the direction D3 with respect to the support member 24.

[Configuration of Lens (Lens 6) for Terahertz Wave Output]

Figure 3:
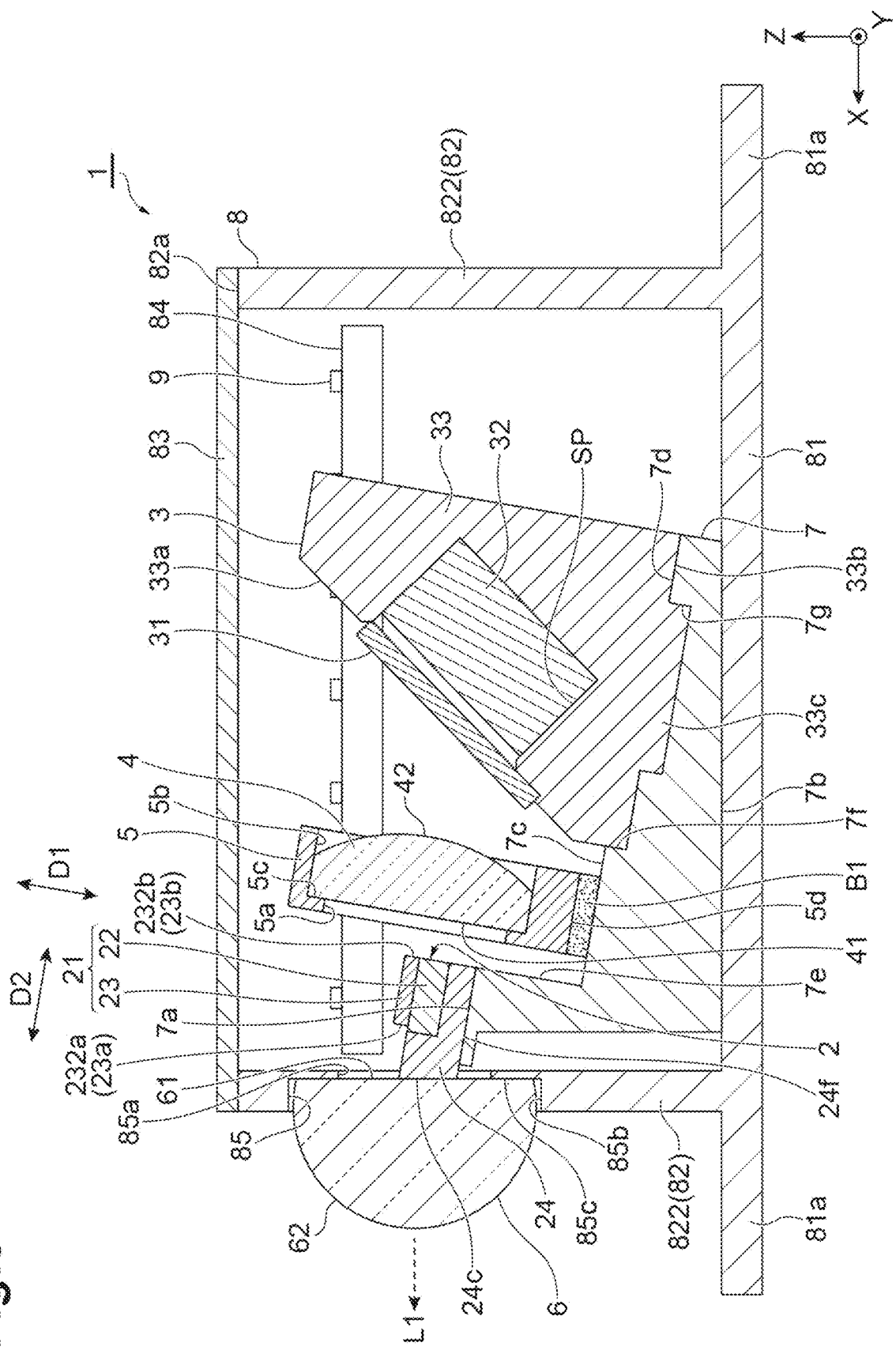
FIG. 3 is a cross-sectional view of the laser module taken along line III-III of FIG. 2.

Lens 6 is a lens for outputting the terahertz wave generated by the QCL element 21 to the outside. As shown in FIG. 3, the lens 6 is disposed at a position facing the surface 24c of the support member 24, and transmits the terahertz wave L1 (see FIG. 4) propagated inside the support member 24. According to the above configuration, by guiding the terahertz wave L1 emitted from the surface 24c of the support member 24 to the lens 6, it is possible to increase the extraction efficiency of the terahertz wave L1.

The lens 6 includes a flat light incident surface 61 (lens surface) facing the surface 24c of the support member 24 and a curved light exit surface 62 that emits the terahertz wave L1, which is output light, to the outside of the package 8. Also, the light incident surface 61 is in contact with the surface 24c of the support member 24. The lens 6 is formed of a material having substantially the same refractive index as that of the second portion P2 of the support member 24. According to the above configuration, it is possible to suppress the reflection of the terahertz wave L1 at the interface between the surface 24c of the support member 24 and the light incident surface 61 of the lens 6, and it is possible to further increase the extraction efficiency of the terahertz wave. Although the light incident surface 61 is in surface contact with the surface 24c in the present embodiment, the light incident surface 61 may be in line contact with the surface 24c. With this configuration, it is possible to obtain the same effect as in the case of surface contact. That is, the terahertz wave L1 can be efficiently propagated from the support member 24 to the lens 6 through the portion where the light incident surface 61 and the surface 24c are in contact with each other.

The lens 6 is, for example, a hemispherical or superhemispherical silicon lens. The silicon lens is not easily scratched. In addition, even if scratches or dirt occur, the terahertz wave L1 having longer wavelengths than visible light, near-infrared light, or the like is less likely to be affected by the scratches or dirt. Therefore, the lens 6 can be disposed so as to be exposed to the outside of the package 8.

However, the material of the lens 6 is not limited to silicon. For example, the lens 6 may be formed of other material that transmits the terahertz wave L1, such as Tsurupica (registered trade mark). In addition, the light exit surface 62 of the lens 6 may be provided with a low-reflection coating for reducing reflectivity of the terahertz wave L1 in order to increase extraction efficiency of the terahertz wave L1.

The lens 6 is attached to a through hole 85 provided in the side wall 822 of the package 8. Hereinafter, the attachment structure of the lens 6 to the through hole 85 will be described in detail.

As shown in FIG. 3, the through hole 85 has a small-diameter hole 85a, a large-diameter hole 85b, and a counterbore surface 85c. The small-diameter hole 85a opens to the inside of the package 8 in the optical axis direction (that is, the X-axis direction) of the lens 6. The large-diameter hole 85b opens to the outside of the package 8 in the X-axis direction. The large-diameter hole 85b includes the small-diameter hole 85a and has a shape larger than the small-diameter hole 85a when viewed from the X-axis direction. The small-diameter hole 85a and the large-diameter hole 85b each extend in the X-axis direction. In the present embodiment, each of the small-diameter hole 85a and the large-diameter hole 85b is formed in a circular shape, and a diameter of the large-diameter hole 85b is larger than a diameter of the small-diameter hole 85a. As an example, the central axes of the small-diameter hole 85a and the large-diameter hole 85b substantially coincide with the optical axis of the lens 6.

The counterbore surface 85c is an annular surface that connects the small-diameter hole 85a and the large-diameter hole 85b and extends along a plane (YZ plane) intersecting the X-axis direction. More specifically, the counterbore surface 85c connects an end portion large-diameter hole 85a on a side facing the large-diameter hole 85b and an end portion of the large-diameter hole 85b on a side facing the small-diameter hole 85a. The large-diameter hole 85b and the counterbore surface 85c can be formed by counterboring the side wall 822 from the outside of the package 8. Although the counterbore surface 85c is formed in a continuous annular shape in the present embodiment, the counterbore surface 85c may be formed in a discontinuous annular shape. For example, a notch may be formed in a part of the inner surface of the small-diameter hole 85a, and the counterbore surface 85c may be divided at the part where the notch is formed. The through hole 85 penetrating in the X-axis direction is formed by the small-diameter hole 85a and the large-diameter hole 85b connected by the counterbore surface 85c.

An outer edge portion of the light incident surface 61 of the lens 6 is inserted into the large-diameter hole 85b from the outside of the package 8 and fixed in surface contact with the counterbore surface 85c. The outer edge of the light incident surface 61 is secured to the counterbore surface 85c by, for example, a securing plastic, adhesive, or the like. The lens 6 attached to the through hole 85 of the side wall 822 functions to receive the terahertz wave L1 output from the QCL element 21 through the support member 24 at the light incident surface 61 and extract the terahertz wave L1 from the light exit surface 62 to the outside of the package 8 while collimating it into a beam shape. The lens 6 also has a function of keeping the inside of the package 8 airtight. According to the above configuration, since the lens 6 for terahertz wave output can be attached to the side wall 822 from the outside of the package 8, the attachment work for the lens 6 can be easily performed. In addition, the lens 6 can be used as a window material that blocks the through hole 85 provided in the package 8 (side wall 822). As a result, the manufacturing cost can be reduced by reducing the number of components, and the entire package can be miniaturized. Further, since it is possible to avoid light loss caused by providing a window material separated from the lens 6 (that is, attenuation of the terahertz wave L1 caused by passing through the window material different from the lens 6), it is also possible to realize high output of the terahertz wave L1. In addition, according to the above method of attaching the lens 6, it is possible to easily and accurately fix the hemispherical or super-hemispherical lens 6 having no edge thickness for holding the lens from the side surface.

[Configuration of External Resonator]

The lens 4 and the movable diffraction grating 31 constitute an external resonator that oscillates the above-described first light (light of the first frequency $\omega_1$). That is, the first light reciprocates between the end surface 232a of the active layer 232 and the movable diffraction grating 31 (in detail, a diffraction grating portion 314 to be described later) through the lens 4, and thus the first light is amplified.

(Configuration of Lens (Lens 4) for External Resonator)

The lens 4 is a lens for an external resonator and transmits mid-infrared light. The lens 4 may be formed of, for example, zinc selenide (ZnSe). The lens 4 is disposed between the QCL element 21 and the movable diffraction grating 31, and transmits light emitted from the end surface 232b (mid-infrared light) and light returning from the movable diffraction grating 31 to the QCL element 21 (active layer 232) (mid-infrared light).

The lens 4 has a first lens surface 41 and a second lens surface 42. The lens 4 is, for example, an aspherical lens. The first lens surface 41 is a surface facing the end surface 21b of the QCL element 21 (the end surface 232b of the active layer 232). The first lens surface 41 may be a flat surface or a non-flat surface (for example, a curved surface that protrudes toward the QCL element 21). The second lens surface 42 is a curved surface facing the movable diffraction grating 31 on a side opposite to the first lens surface 41. The first lens surface 41 and the second lens surface 42 may be provided with, for example, a low reflection coating having a reflectivity of 5% or less with respect to a wavelength corresponding to the gain peak of the QCL element 21. As the material of the lens 4, a material that transmits mid-infrared light such as Ge or $CaF_2$ may be used.

The lens 4 is fixed to the lens holder 5 so that the optical axes of the lens 4 and the resonance axes of the QCL element 21 (I.e., the axes parallel to the direction 232a passing through the end surface 232b and the end surface D2 of the active layer 232 and the optical axes of the mid-infrared light emitted by the QCL element 21) substantially coincide with each other. That is, the lens 4 and the movable diffraction grating 31 are disposed so as to be inclined with respect to the horizontal plane (XY plane) in the same manner as the QCL element 21.

The lens 4 is held by the lens holder 5. As an example, the lens holder 5 has a substantially rectangular parallelepiped outer shape. The lens holder 5 has a small-diameter hole 5a, a large-diameter hole 5b, and a counterbore surface 5c. The small-diameter hole 5a opens to the QCL element 21 side in the optical axis direction (direction D2) of the lens 4. The large-diameter hole 5b opens to the movable diffraction grating 31 side in the direction D2. The large-diameter hole 5b includes the small-diameter hole 5a and has a shape larger than the small-diameter hole 5a when viewed from the direction D2. The small-diameter hole 5a and the large-diameter hole 5b each extend in the direction D2. Each of the small-diameter hole 5a and the large-diameter hole 5b is formed in a circular shape, and a diameter of the large-diameter hole 5b is larger than that of the small-diameter hole 5a. As an example, the central axes of the small-diameter hole 5a and the large-diameter hole 5b substantially coincide with the optical axe of the lens 4. The counterbore surface 5c is an annular surface connecting the small-diameter hole 5a and the large-diameter hole 5b and extending along a plane intersecting the direction D2. More specifically, the counterbore surface 5c connects an end portion of the small-diameter hole 5a on a side facing the large-diameter hole 5b and an end portion of the large-diameter hole 5b on a side facing the small-diameter hole 5a. An outer edge portion of the first lens surface 41 of the lens 4 is inserted into the large-diameter hole 5b and fixed in surface contact with the counterbore surface 5c. The outer edge portion of the first lens surface 41 is fixed to the counterbore surface 5c by, for example, a fixing plastic, an adhesive, or the like.

(Configuration of Diffraction Grating Unit)

Figure 8:
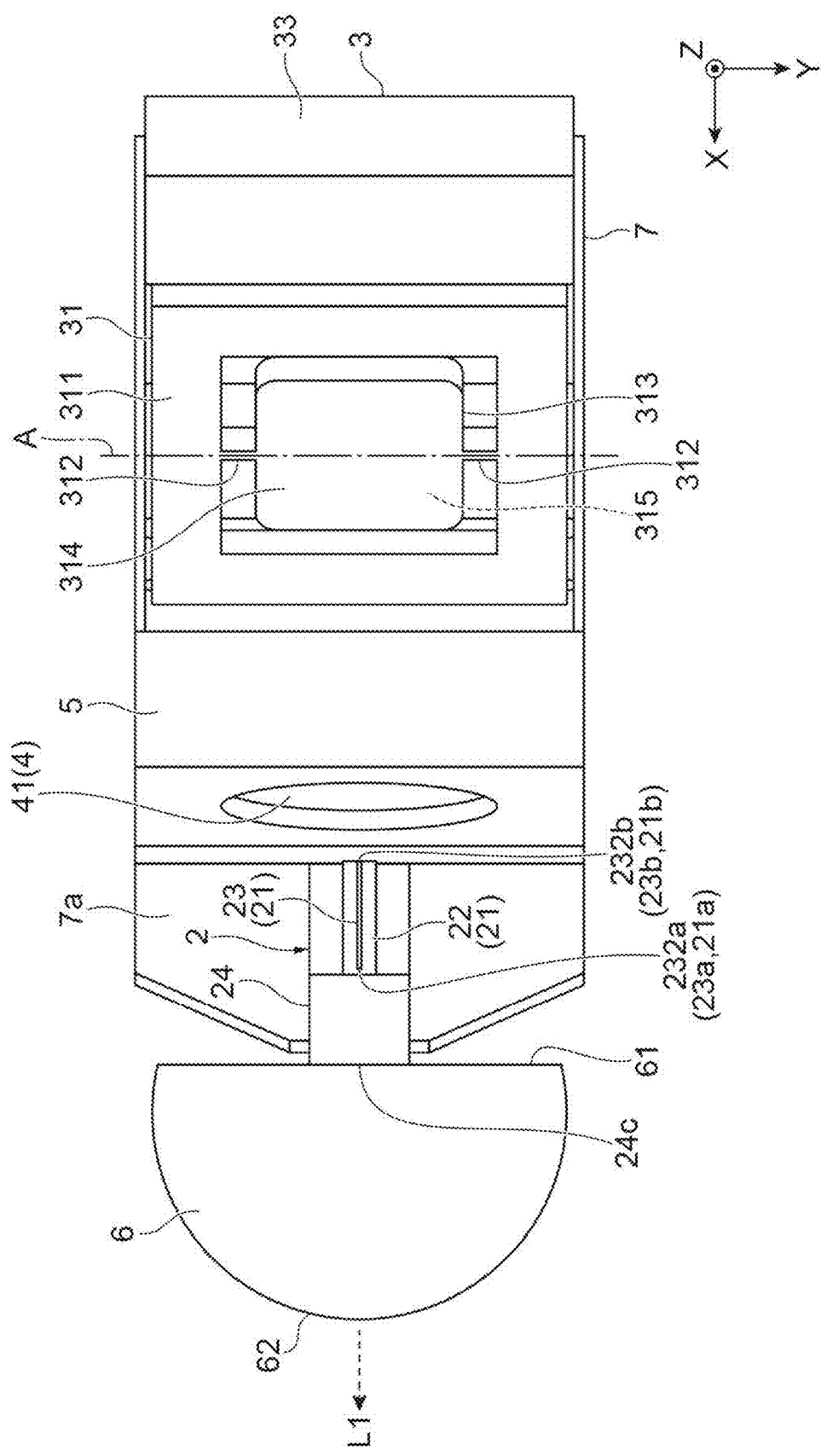
FIG. 8 is a plan view showing the arrangement of the components housed in the package.

As illustrated in FIGS. 3 and 8, the diffraction grating unit 3 is disposed on a side opposite to a side on which the QCL element 21 is disposed with respect to the lens 4 (lens holder 5). The diffraction grating unit 3 includes a movable diffraction grating 31, a magnet 32, and a yoke 33. The movable diffraction grating 31 is formed in a substantially plate shape. The movable diffraction grating 31 is a MEMS diffraction grating manufactured using, for example, a MEMS process. The movable diffraction grating 31 is not limited to a specific configuration. For example, the movable diffraction grating 31 may be an electrostatic drive type in which the diffraction grating angle can be fixed at an arbitrary angle, or may be an electromagnetic drive type in which high-frequency angle modulation at a resonance frequency can be performed. The magnet 32 is disposed on a side opposite to the QCL element 21 with respect to the movable diffraction grating 31. The movable diffraction grating 31 is fixed to the yoke 33, and the magnet 32 is housed in the yoke 33. As described above, the movable diffraction grating 31, the magnet 32, and the yoke 33 are integrated to form one unit.

The light collimated by the lens 4 enters the movable diffraction grating 31. The movable diffraction grating 31 diffracts and reflects the incident light, thereby returning light of specific wavelengths of the incident light to the end surface 232b of the active layer 232 via the lens 4. In this embodiment, the movable diffraction grating 31 and the end surface 232b constitute a Littrow type external resonator.

In the movable diffraction grating 31, the direction of the diffraction grating portion 314 that diffracts and reflects the incident light can be changed at high speed. Thus, the wavelength of light returning from the movable diffraction grating 31 to the end surface 232b of the active layer 232 (i.e., the wavelength corresponding to the first frequency $\omega 1$) is variable. That is, it is possible to change the wavelength of the terahertz wave L1 generated by generating the difference frequency between the first frequency $\omega_1$ and the second frequency $\omega_2$. Thus, the wavelength-sweeping can be performed within the range of the gain band of the QCL element 21.

As shown in FIG. 8, the movable diffraction grating 31 includes a support portion 311, a pair of connection parts 312, a movable portion 313, a diffraction grating portion 314, and a coil 315. The movable diffraction grating 31 is configured as a MEMS device that causes the movable portion 313 to swing about an axis A passing through the pair of connection parts 312. The axis A is an axis parallel to the Y-axis direction.

The support portion 311 is a flat plate-shaped frame body having a rectangular shape in a plan view. The support portion 311 supports the movable portion 313 via a pair of connection parts 312. Each connection part 312 is a flat plate-like member having a rectangular bar shape in a plan view, and extends straight along the axis A. Each connection part 312 connects the movable portion 313 to the support portion 311 on the axis A so that the movable portion 313 is swingable about the axis A.

The movable portion 313 is located inside the support portion 311. The movable portion 313 is swingable about the axis A as described above. The movable portion 313 is a flat plate-shaped member having a substantially rectangular shape in a plan view. The support portion 311, the connection part 312, and the movable portion 313 are integrally formed, for example, by being built into one SOI (Silicon on Insulator) substrate.

The diffraction grating portion 314 is provided on a surface (mirror surface) of the movable portion 313 on the QCL element 21 side. The diffraction grating portion 314 has a plurality of grating grooves (not shown) and diffracts and reflects the light emitted from the QCL element 21. The diffraction grating unit 3 is disposed such that the optical axis of the lens 4 (i.e., the optical axis of the mid-infrared light collimated by the lens 4) substantially coincides with the center of the diffraction grating portion 314, and light incident on the diffraction grating portion 314 is diffracted in a direction opposite to the incident direction on the optical axis.

The diffraction grating portion 314 includes, for example, a resin layer which is provided on the surface of the movable portion 313 and formed with a diffraction grating pattern, and a metal layer provided over the surface of the resin layer along the diffraction grating pattern. Alternatively, the diffraction grating portion 314 may be formed of only a metal layer provided on the movable portion 313 and having a diffraction grating pattern formed thereon. As the diffraction grating pattern, for example, a blazed grating having a saw-tooth cross section, a binary grating having a rectangular cross section, a holographic grating having a sinusoidal cross section, or the like can be used. The diffraction grating pattern is formed on the resin layer by, for example, nanoimprint lithography. The metal layer is, for example, a metal reflection film made of gold, and is formed by vapor deposition. The periods and depths of the grating grooves in the diffraction grating portion 314 are configured such that, for example, the diffraction efficiency is maximized for wavelength corresponding to the gain peak of the QCL element 21. Here, the diffraction efficiency means efficiency when light incident on the diffraction grating portion 314 is diffracted in the opposite direction on the same optical axis.

The coil 315 is made of a metal material such as copper, and has a damascene structure embedded in a groove formed in the surface of the movable portion 313. The coil 315 is a drive coil through which a current for driving the movable diffraction grating 31 (that is, for swinging the movable portion 313) flows.

The magnet 32 generates a magnetic field (magnetic force) that acts on the coil 315. The magnet 32 is a neodymium magnet (permanent magnet) formed in a substantially rectangular parallelepiped shape.

The yoke 33 amplifies the magnetic force of the magnet 32 and forms a magnetic circuit together with the magnet 32. The surface of the yoke 33 is black-processed by, for example, zinc plating. The yoke 33 has an inclined surface 33a, a lower surface 33b, and a protruding portion 33c.

The inclined surface 33a is inclined with respect to the end surface 21b of the QCL element 21. Since the movable diffraction grating 31 is fixed on the inclined surface 33a, the normal direction of the diffraction grating portion 314 of the movable diffraction grating 31 may be inclined with respect to the end surface 21b. The inclination angle of the inclined surface 33a (the angle with respect to the end surface 21b of the QCL element 21) is set in accordance with the oscillation wave length of the QCL element 21, the number of grating grooves in the diffraction grating portion 314, the blazed angle, and the like.

The yoke 33 is formed in a substantially U-shape (inverted C-shape) when viewed from the Y-axis direction, and defines a layout space SP opened in the inclined surface 33a. The magnet 32 is disposed in the layout space SP, and the magnet 32 is accommodated in the yoke 33. The movable diffraction grating 31 is fixed to the inclined surface 33a at the edge portion of the support portion 311 so as to cover the opening of the layout space SP.

In the movable diffraction grating 31, when a current flows through the coil 315, a Lorentz force is generated in a predetermined direction in electrons flowing through the coil 315 by a magnetic field formed by the magnet 32 and the yoke 33. As a result, the coil 315 receives a force in a predetermined direction. Therefore, by controlling the direction or magnitude of the current flowing through the coil 315, the movable portion 313 (diffraction grating portion 314) can be swung around the axis A. In addition, the movable portion 313 can be swung at high speed at the level of the resonance frequencies (for example, at frequencies equal to or higher than 1 kHz) by causing currents having frequencies corresponding to the resonance frequencies of the movable portion 313 to flow through the coils 315.

[Configuration of Holder]

Next, the configuration of the holder 7 will be described with reference to FIG. 3. The holder 7 is a member that holds (supports) the QCL unit 2 in the package 8. The holder 7 also functions as a heat bath for suppressing heat generation of the QCL unit 2 when the QCL element 21 is driven. The holder 7 may be formed of, for example, a material that has good thermal conductivity, can be precisely machined, and has sufficient hardness and rigidity for shape maintenance. The holder 7 can be formed of, for example, a metal material such as copper tungsten similar to the bottom wall 81.

In the present embodiment, in addition to the QCL unit 2, the lens 4 (lens holder 5) and the diffraction grating unit 3 are also fixed to the holder 7. That is, all members constituting an external resonator for oscillating the first light are supported by the holder 7. According to the above configuration, before the QCL unit 2, the lens 4 (lens holder 5), and the diffraction grating unit 3 are housed in the package 8, these members can be fixed to the holder 7 and positional adjustment (positioning) between the members can be performed. That is, after the QCL unit 2, the lens 4 (lens holder 5), and the diffraction grating unit 3 are mounted on the holder 7 while performing the above-described position adjustment, the holder 7 can be accommodated in the package 8. Thus, the working efficiency can be improved as compared with the case where the position adjustment of each member is performed in the package 8.

The holder 7 is fixed on the bottom wall 81 in the package 8. For example, the bottom surface 7b of the holder 7 is fixed to the bottom wall 81 by an adhesive or the like. However, as described above, another member such as a Peltier element may be interposed between the holder 7 and the bottom wall 81. Further, the holder 7 may be attached to a portion other than the bottom wall 81 (for example, the side wall 82).

The holder 7 has a support surface 7a on which the QCL unit 2 is placed, a support surface 7c on which the lens holder 5 is placed, and a support surface 7d on which the diffraction grating unit 3 is placed, in order from the side on which the lens 6 is disposed, along the direction D2. These support surfaces 7a, 7c, and 7d are inclined so as to be parallel to the resonance direction (direction D2) of the external resonator. By disposing the respective members (the QCL unit 2, the lens holder 5, and the diffraction grating unit 3) on the respective support surfaces 7a, 7c, and 7d inclined in this manner, it is possible to appropriately determine the positional relationship between the respective members constituting the external resonator. The support surface 7a is located at a position higher than the support surface 7c, and the support surface 7c is located at a position higher than the support surface 7d, with reference to the upper surface of the bottom wall 81. A step is formed between the support surface 7a and the support surface 7c, and a step is formed between the support surface 7c and the support surface 7d.

The holder 7 includes a side surface 7e that connects the support surface 7a and the support surface 7c, and a side surface 7f that connects the support surface 7c and the support surface 7d. The side surfaces 7e and 7f are perpendicular to the direction D2. The side surface 7e is a surface facing the lens 4 (lens holder 5) in the direction D2. The lens holder 5 is mounted on the support surface 7c so as to be spaced apart from the side surface 7e. The side surface 7f comes into contact with the side surface of the yoke 33 on the lens holder 5 side and has a function of positioning the yoke 33. In the support surface 7d, a concave portion 7g into which the protruding portion 33c provided in the lower surface 33b of the yoke 33 is inserted is formed. The diffraction grating unit 3 is fixed to the support surface 7d by fitting the protruding portion 33c into the concave portion 7g.

The QCL unit 2 is fixed to the support surface 7a by fixing the surface 24f of the support member 24 to the support surface 7a of the holder 7. Further, the bottom surface 5d of the lens holder 5 is fixed to the support surface 7c via the adhesive layer B1. The adhesive layer B1 is made of, for example, photo-curable resins. The lens holder 5 is fixed to the support surface 7c so that the optical axis of the lens 4 and the resonance axis of the QCL element 21 (optical axis of mid-infrared light emitted from the end surface 232b) coincide with each other. For example, the height position of the lens holder 5 with respect to the support surface 7c can be finely adjusted by adjusting the amount of the adhesive layer B1, the strength with which the lens holder 5 is pressed against the adhesive layer B1, or the like. However, the method of fixing the lens holder 5 to the support surface 7c is not limited to the above. For example, the lens holder 5 may be fixed to the support surface 7c by screwing or the like.

The laser module 1 is manufactured in the following manner, for example. First, the lens 6 is attached to the through hole 85 of the package 8 before the top wall 83 is attached. Subsequently, the QCL unit 2, the lens 4 (lens holder 5), and the diffraction grating unit 3 are attached to the holder 7 outside the package 8. At this time, the positions of the QCL unit 2, the lens 4 (lens holder 5), and the diffraction grating unit 3 are adjusted so that the resonance axis of the QCL element 21 coincide with the optical axis of the lens 4 and the optical axis passes through the center of the diffraction grating portion 314. Subsequently, the holder 7 on which the respective members are mounted as described above is housed in the package 8. The holder 7 is fixed in the package 8 so that the surface 24c of the support member of the QCL unit 2 is in contact with (or close to) a substantially central portion of the light incident surface 61 of the lens 6. Subsequently, a member (the QCL element 21 or the like) requiring electrode supply among the members housed in the package 8 and the electrode terminal (the lead terminal 9) are electrically connected by a wire or the like (not shown). After the arrangement of each member in the package 8 and the wiring process are completed, the inside of the package 8 is evacuated or nitrogenated, and the top wall 83 is airtightly joined to the end portion 82a of the side wall 82 on the side opposite to the bottom wall 81 side. Thus, the above-described laser module 1 is obtained.

[Effect]

The laser module 1 described above includes the support member 24 that supports the substrate 22 of the QCL element 21. As shown in FIG. 4, at least a part of the terahertz wave L1 generated in the active layer 232 passes through the inside of the second portion P2 of the support member 24 and is emitted from the surface 24c. Here, if a configuration in which the terahertz wave is directly output from the end surface 22a of the substrate 22 toward the outside (for example, lens) is adopted, it is necessary to form a polished surface inclined with respect to a plane along the directions D1 and D3 (that is, a plane perpendicular to the direction D2) on the end surface 22a in order to increase extraction efficiency of the terahertz wave. Since the process of forming such a polished surface is relatively difficult, the productivity of the QCL element 21 may be reduced. Further, the substrate may be damaged when the polishing surface formed in this manner is brought into contact with the lens. Meanwhile, in the laser module 1, since the terahertz wave L1 is output to the outside through the support member 24 (second portion P2), it is not necessary to form a polished surface on the end surface 22a of the substrate 22. In addition, by pressing the end surface 22a against the surface 24b of the support member 24, it is possible to stably fix the substrate 22 to the support member 24 while appropriately protecting the end surface 22a. Therefore, it is possible to prevent the lowering of productivity and the breakage of the substrate as described above. As described above, according to the laser module 1, it is possible to improve productivity and prevent damage.

Further, since the support member 24 has not only the second portion P2 but also the first portion P1 facing the end surface 22d of the substrate 22, it is possible to improve the heat dissipation of the QCL element 21 and the handling property during manufacturing. More specifically, heat generated in the QCL element 21 can be appropriately released from the substrate 22 to the support member 24 through the contact portion between the end surface 22d and the surface 24a. In addition, by attaching the QCL element 21 to the support member 24 having the first portion P1 and the second portion P2, it is possible to obtain the QCL unit 2 whose size is increased in both the directions D1 and D2 as compared with the QCL element 21 alone. In the present embodiment, since the width (for example, 3 mm) of the support member 24 in the direction D3 is larger than the width (for example, 1 mm) of the QCL element 21, the size of the QCL unit 2 is also increased in the direction D3 compared to the QCL element 21 alone. Since it is easier to grip the support member 24 of the QCL unit 2 whose size is increased as described above than to grip the QCL element 21 alone (for example, a portion of the substrate 22), it is possible to improve handling properties (for example, portability) of the QCL element 21. In addition, by providing the support member 24 as the base, it is possible to improve workability when pressing the QCL unit 2 against the lens 6. As a result, damage to the QCL element 21 during manufacturing and operation can be suitably prevented, and reliability can be improved.

In addition, the laser module 1 includes a holder 7 that holds the QCL unit 2 (that is, the QCL element 21 and the support member 24) and the package 8 that accommodates the QCL unit 2 and the holder 7. According to the above configuration, since the QCL unit 2 including the QCL element 21 and the support member 24 is accommodated in the package 8, it is possible to prevent the QCL unit 2 from being damaged and to obtain the laser module 1 having high reliability.

The package 8 further accommodates the movable diffraction grating 31 and the lens 4, and an optical path between the lens 4 and the movable diffraction grating 31 is disposed in the package 8. According to the above configuration, in a configuration in which the first light is oscillated using the movable diffraction grating 31 as an external resonator, the external resonator is also accommodated in the package 8, and thus it is possible to obtain the laser module 1 with high reliability.

Note that the configuration of the QCL unit is not limited to the above embodiment (QCL unit 2). Hereinafter, some modifications of the QCL unit will be described with reference to FIGS. 9A to 13.

First Modification Example

As illustrated FIG. 9A, the QCL unit 2A according to the first modification example is different from the QCL unit 2 in that the QCL unit 2A includes an adhesive layer 26a in addition to the adhesive layer 26. More specifically, in the QCL unit 2A, the surface 24a of the support member 24 is adhered to the end surface 22d of the substrate 22 via the adhesive layer 26 (first adhesive layer), and the surface 24b of the support member 24 is also adhered to the end surface 22a of the substrate 22 via the adhesive layer 26A (second adhesive layer). In addition, the adhesive layer 26a has substantially the same refractive index as that of the second portion P2 of the support member 24.

According to the QCL unit 2A, it is possible to more stably fix the substrate 22 with respect to the support member 24 compared to a case in which the adhesive layer 26a is not provided between the end surface 22a of the substrate 22 and the surface 24b of the support member 24 (that is, the QCL unit 2). In addition, by providing the adhesive layer 26a having substantially the same refractive index as that of the second portion P2 between the surface 24b and the end surface 22a, it is possible to suppress loss of the terahertz wave that may occur when an adhesive layer having a refractive index relatively largely different from that of the second portion P2 is disposed between the surface 24b and the end surface 22a. In addition, since it is possible to suppress an air layer from being interposed between the end surface 22a and the surface 24b, it is also possible to suppress a loss of the terahertz wave caused by the air layer.

Second Modification Example

As illustrated in FIG. 9B, the QCL unit 2B according to the second modification example is different from the QCL unit 2 in that the end surface 22b of the substrate 22 and the end surface 232b of the active layer 232 (in the present embodiment, the entirety of the end surface 23b of the semiconductor layer 23 including the end surface 232b) protrude further toward the second side S2 than the surface 24d of the support member 24. The end surface 22b and the end surface 23b are formed to be flush with each other.

According to the QCL unit 2B, when the first light is oscillated using an external resonator (movable diffraction grating 31) disposed at a position facing the end surface 232b of the active layer 232, it is possible to more reliably prevent interference between the light emitted from the end surface 232b toward the external resonator and the support member 24 (that is, a portion including the surface 24d). As a result, it is possible to more reliably avoid a decrease in coupling efficiency between the QCL element 21 and the external resonator.

Third Modification Example and Fourth Modification Example

As illustrated in FIG. 10A and FIG. 10B, the QCL unit 2C according to the third modification example and the QCL unit 2D according to the fourth modification example are different from the QCL unit 2 in that the support member 24 is formed of a first member 24A including a first portion P1 and a second member 24B including a second portion P2.

The second member 24B is a separate member from the first member 24A. The first member 24A and the second member 24B are fixed to each other so that the positional relationship therebetween does not shift. A method of fixing the first member 24A and the second member 24B to each other is not limited to a specific method. For example, the first member 24A and the second member 24B may be bonded (joined) to each other using an adhesive or the like, or the first member 24A and the second member 24B may be fixed to each other via a member or the like that sandwiches the first member 24A and the second member 24B.

Although the surface 24a (first surface) and the surface 24b (second surface) are connected to each other in this embodiment, "the surface 24a and the surface 24b are connected to each other" means that the first portion P1 including the surface 24a and the second portion P2 including the surface 24b are integrally formed (that is, the first member 24A and the second member 24B are not separated but integrally formed) or that the first member 24A and the second member 24B are fixed to each other so that the relative positional relationship between the first member 24A and the second member 24B does not change as in the present modification (the third modification and the fourth modification).

According to the above configuration, by constituting the first portion P1 and the second portion P2 as separate members (first member 24A and second member 24B), it is possible to easily manufacture the support member 24. For example, in a case where it is difficult to perform processing of a portion where the surface 24a and the surface 24b intersect with each other in the integrally formed support member 24 with sufficient accuracy, by combining the first member 24A and the second member 24B, the accuracy of the portion can be easily obtained, and the manufacturing difficulty of the support member 24 can be reduced.

As illustrated in FIG. 10A, in the QCL unit 2C, the support member 24 is divided into a first member 24A and a second member 24B with a plane along the surface 24a as a boundary surface B. That is, the support member 24 is divided into a portion (first member 24A) below the boundary surface B (on the side opposite to the side where the QCL element 21 is located with respect to the boundary surface B) and a portion (second member 24B) above the boundary surface B (on the side where the QCL element 21 is located with respect to the boundary surface B). In the QCL unit 2C, the surface 24c of the support member 24 is formed by connecting the surface 24c1 of the first member 24A and the surface 24c2 of the second member 24B in a continuous manner. Similarly, the surface 24g of the support member 24 is formed by continuously connecting the surface 24g1 of the first member 24A and the surface 24g2 of the second member 24B.

As illustrated in FIG. 10B, in the QCL unit 2D, the support member 24 is divided into a first member 24A and a second member 24B with a plane along the surface 24b as a boundary surface B. That is, the support member 24 is divided into a portion (first member 24A) on the second side S2 (side on which the QCL element 21 is located with respect to the boundary surface B) with respect to the boundary surface B and a portion (second member 24B) on the first side Si (side opposite to the side on which the QCL element 21 is located with respect to the boundary surface B). In the QCL unit 2D, the surface 24f of the support member 24 is formed by connecting the surface 24f1 of the first member 24A and the surface 24f2 of the second member 24B in a continuous manner. Similarly, the surface 24g of the support member 24 is formed by continuously connecting the surface 24g1 of the first member 24A and the surface 24g2 of the second member 24B.

In any configuration of the QCL units 2C and 2D, the support member 24 can be easily manufactured by combining two substantially rectangular parallelepiped members (the first member 24A and the second member 24B).

In a case where the support member 24 is divided into the first member 24A including the first portion P1 and the second member 24B including the second portion P2 as in the third modification example and the fourth modification example, the first member 24A may be formed of a material having a heat conductivity higher than that of the second member 24B. The support member 24 has a role of emitting the terahertz wave L1 propagated through the substrate 22 from the surface 24c, and the role is mainly played by the second portion P2 rather than the first portion P1. Therefore, as the material of the first portion P1, it is possible to adopt a material having a lower transmissivity of the terahertz wave L1 than that of the second portion P2 and a higher heat conductivity than that of the second portion P2. For example, the second portion P2 may be formed of the material (HRFZ-Si) of the support member 24 described above, and the first portion P1 may be formed of a metal (Cu, Mo, or the like), a diamond-based material, ceramics (SiC, AlN, $Al_2O_3$, or the like), or the like. According to the above configuration, the first member 24A in contact with the bottom surface (end surface 22d on the side opposite to the active layer 232 side) of the substrate 22 among the support member 24 is formed of a material having a higher heat conductivity than that of the second member 24B. As a result, heat dissipation efficiency for heat generated in the QCL element 21 can be improved, and reliability of operation of the QCL element 21 can be improved.

Fifth Modification Example

Figure 11A:
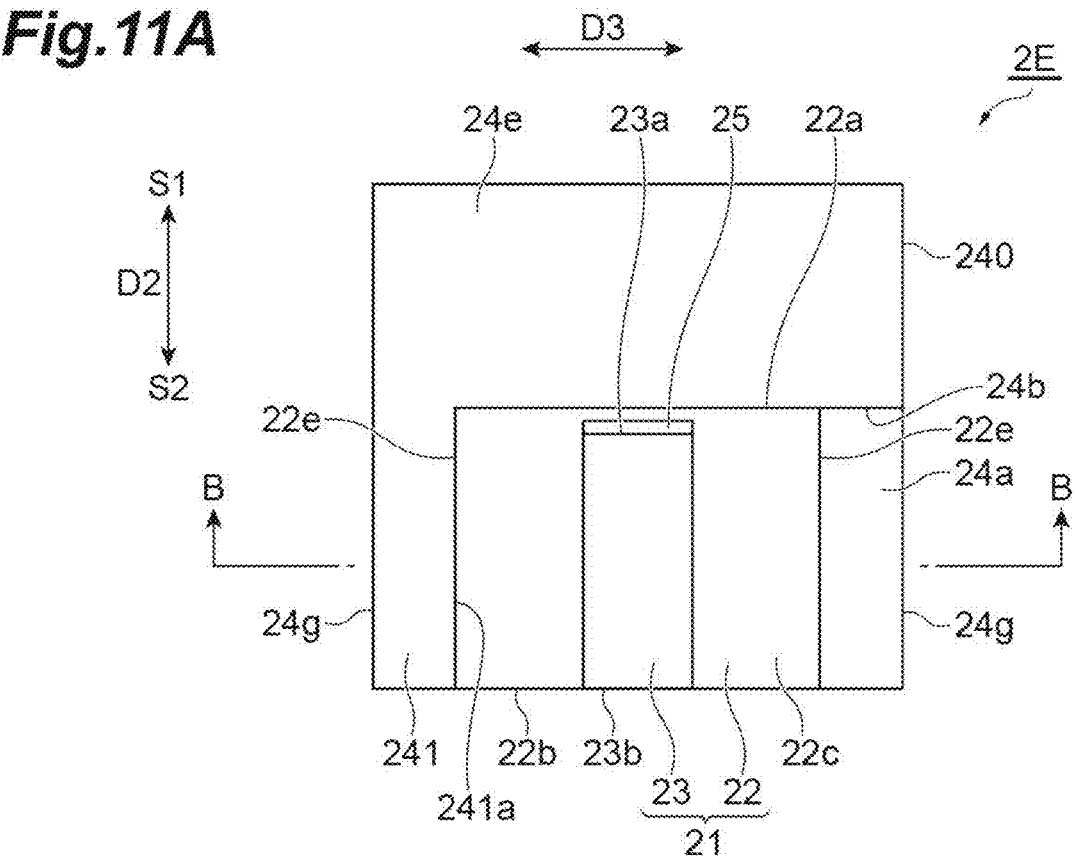
FIG. 11A is a plan view of a QCL unit according to a fifth modification example.
Figure 11B:
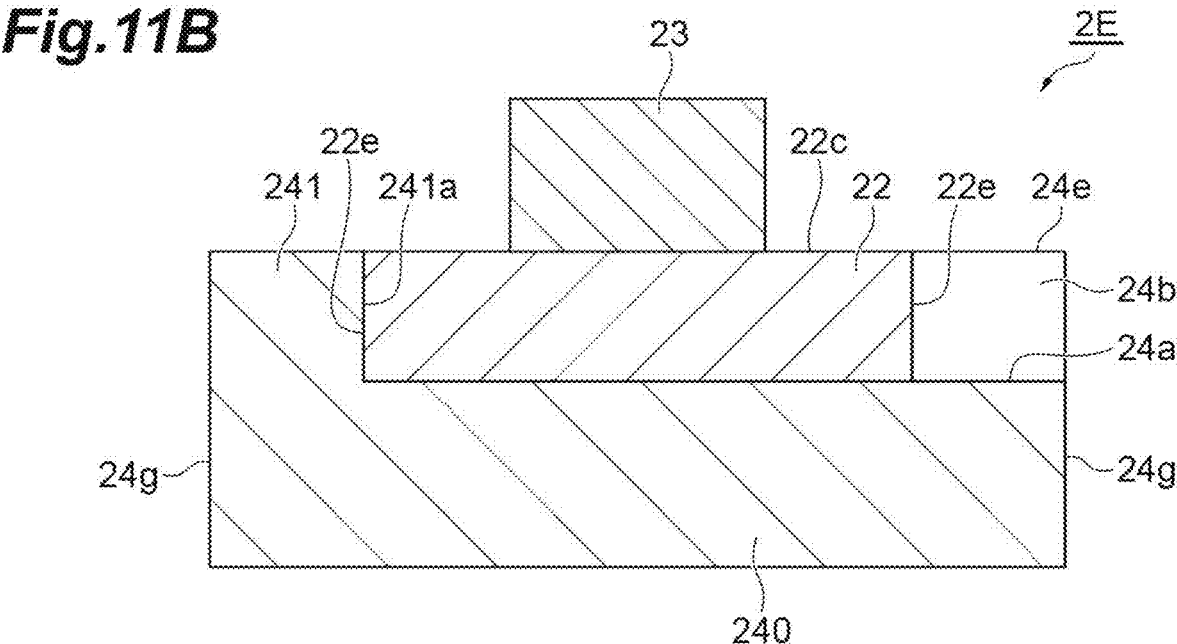
FIG. 11B is a schematic cross-sectional view of the QCL unit taken along line B-B of FIG. 11A.

As illustrated in FIGS. 11A and 11B, the QCL unit 2E according to the fifth modified example is different from the QCL unit 2 in that a support member 240 is provided instead of the support member 24. FIG. 11B schematically shows a cross-sectional structure of the QCL unit 2E taken along line B-B in FIG. 11A. The support member 240 has a wall portion 241 erected on the surface 24a so as to face at least a part of the substrate 22 on one side of the QCL element 21 in the direction D3. In the example of FIGS. 11A and 11B, the wall portion 241 is provided so as to overlap with the entirety of one end surface 22e of the substrate 22 when viewed from the direction D3. That is, the upper surface of the wall portion 241 is flush with and continuous with the surface 24e. Further, a side surface 241a of the wall portion 241 facing one end surface 22e of the substrate 22 is in contact with the one end surface 22e. In other words, the wall portion 241 functions as a member for positioning the substrate 22 in the direction D3.

According to the QCL unit 2E, when the QCL element 21 is fixed to the support member 240, the positioning of the QCL element 21 in the direction D3 can be easily performed by pressing the substrate 22 of the QCL element 21 against the wall portion 241. In addition, since the contact areas between the substrate 22 and the support member 240 may be increased by contact areas between the side surface 241a of the wall portion 241 and the end surface 22e of the substrate 22 as compared to a case in which the wall portion 241 is not provided, heat dissipation efficiency for heat generated in the QCL element 21 may be improved.

Sixth Modification Example

Figure 13:
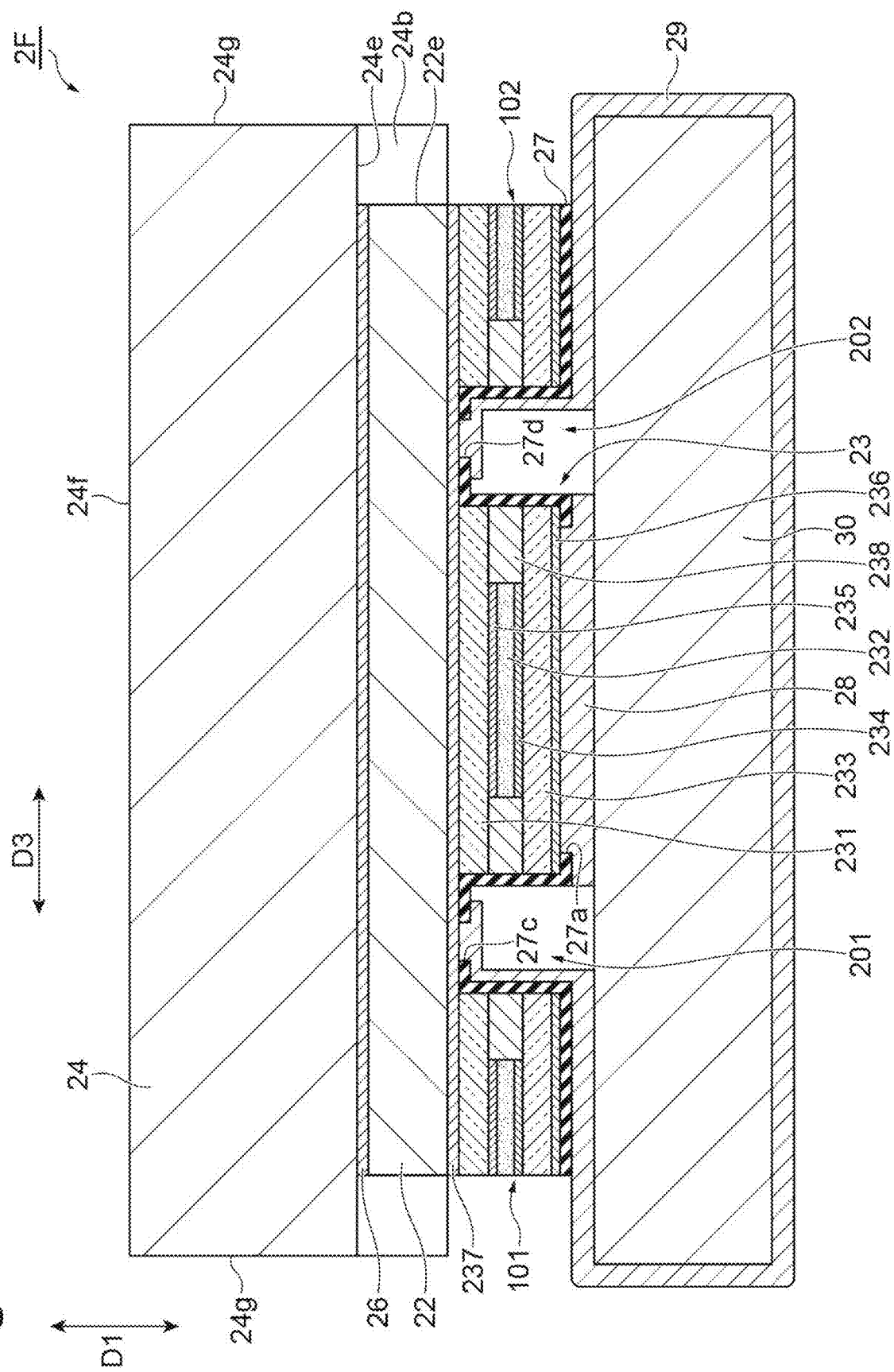
FIG. 13 is a cross-sectional view of the QCL unit taken along line XIII-XIII of FIG. 12.

The above-described QCL units 2 and 2A to 2E are used in a form (so-called epi-side-up state) in which a member (holder 7 in the present embodiment) supporting the QCL unit 2 and 2A to 2E is provided on the opposite side of the substrate 22 from the semiconductor layer 23. On the other hand, as illustrated in FIGS. 12 and 13, the QCL unit 2F according to the sixth modification example is used in a form (so-called epi-side-down state) in which a member (in this example, the sub-mount 30) supporting the QCL unit 2F is provided on the side where the semiconductor layer 23 is located with respect to the substrate 22. That is, the QCL unit 2F is not fixed by attaching the support member 24 to another member (for example, the holder 7) but is fixed by attaching the semiconductor layer 23 to another member (here, the sub-mount 30).

As shown in FIG. 13, the QCL unit 2F has peripheral portions 101 and 102 having a layer structure similar to that of the semiconductor layer 23 (ridge portion) on both sides of the semiconductor layer 23 in the direction D3 so as to be suitable for such epi-side-down assembly. Groove portions 201 and 202 formed by etching are provided between the semiconductor layer 23 and the peripheral portions 101, 102. The first electrode 28 and the second electrode 29 are provided on the surface of the sub-mount 30. The first electrode 28 is disposed between the sub-mount 30 and the upper contact layer 236 of the semiconductor layer 23, and is electrically connected to the upper contact layer 236 via the contact hole 27a of the insulating film 27. The second electrode 29 is electrically connected to the lower contact layer 237 via the contact holes 27c and 27d of the insulating film 27. The contact hole 27c is an opening provided in a portion corresponding to the groove portion 201 of the insulating film 27 formed over the semiconductor layer 23 and the peripheral portion 101. The contact hole 27d is an opening provided in a portion corresponding to the groove portion 202 of the insulating film 27 formed over the semiconductor layer 23 and the peripheral portion 102.

As described above, the QCL unit including the QCL element 21 and the support member 24 may be configured in the epi-side-up form (QCL unit 2, 2A to 2E) or in the epi-side-down form (QCL unit 2F).

Other Modifications

Although an embodiment of the present disclosure and some modifications (first modifications to sixth modifications) of the QCL unit have been described above, the present disclosure is not limited to the above-described embodiment. The material and shape of each component are not limited to the specific material and shape described above, and various materials and shapes other than those described above may be employed. In addition, some configurations included in the above-described embodiment and each modification example (QCL units 2A to 2F) may be appropriately omitted or changed, and may be arbitrarily combined.

For example, in the laser module 1 of the above-described embodiment, the QCL unit 2 is accommodated in the package 8, but the QCL unit 2 may be used in a form in which the QCL unit 2 is not accommodated in the package 8. In addition, when the QCL element 21 is configured to be able to oscillate the first light and the second light by itself (that is, when the end surfaces 232a and 232b of the active layer 232 constitute resonators of both first light and second light), the movable diffraction grating 31 as an external resonator may be omitted. That is, the laser module according to the present disclosure may be configured by only the QCL unit. In addition, when the laser module 1 includes the package 8, the size of the package 8 is not particularly limited. In other words, the laser module 1 is not necessarily limited to one that is miniaturized to be equal to or smaller than the hand-top size. The type of the package 8 is not limited to a butterfly package. Although the lens 6 also serves as the light incident window (window member) of the package 8 in the above-described embodiment, the lens 6 may be housed inside the package 8. In this case, a window material different from the lens 6 may be provided in the through hole 85 of the side wall 822 of the package 8.

What is claimed is:

1. A laser module comprising:
a quantum cascade laser element including: a substrate; a first clad layer provided on the substrate; an active layer provided on an opposite side of the first clad layer from the substrate and configured to generate a terahertz wave having a difference frequency between a first frequency and a second frequency; and a second clad layer provided on an opposite side of the active layer from the first clad layer; and
a support member configured to support the substrate of the quantum cascade laser element and propagate the terahertz wave, wherein
the quantum cascade laser element includes:
 a first end surface located on a first side in a second direction orthogonal to a first direction that is a stacking direction of the substrate, the first clad layer, the active layer, and the second clad layer; and
 a second end surface located on a second side opposite to the first side in the second direction,
the substrate includes:
 a first substrate-surface that constitutes a part of the first end surface and extends along the first direction and along a third direction which is orthogonal to the first direction and the second direction;
 a second substrate-surface that constitutes a part of the second end surface;
 a third substrate-surface facing the active layer in the first direction; and
 a fourth substrate-surface located on an opposite side from the third substrate-surface in the first direction,
the active layer includes:
 a first active-layer-surface that constitutes a part of the first end surface and constitutes a resonator for oscillating light of the first frequency and light of the second frequency; and
 a second active-layer-surface that constitutes a part of the second end surface,
the support member includes:
 a first portion including a first surface facing at least a portion of the fourth substrate-surface; and
 a second portion including: a second surface connected to the first surface and facing at least a portion of the first substrate-surface; and a third surface located on an opposite side from the second surface in the second direction, and
at least a portion of the terahertz wave generated in the active layer is incident on the second surface of the support member through the substrate and is emitted from the third surface through an inside of the second portion.

2. The laser module according to claim 1, wherein
the third surface is inclined with respect to the second surface so as to approach the second surface from a side at which the third substrate-surface is located toward a side at which the fourth substrate-surface is located along the first direction.

3. The laser module according to claim 1, wherein
the first active-layer-surface is located to the second side of the first substrate-surface so as to be spaced apart from the second surface in the second direction.

4. The laser module according to claim 1, further comprising a reflection film provided to cover the first active-layer-surface and improve reflectivity of the light of the first frequency and the light of the second frequency.

5. The laser module according to claim 1, wherein
the first portion and the second portion are integrally formed.

6. The laser module according to claim 1, wherein
the support member includes:
a first member including the first portion; and
a second member including the second portion and being a separate member from the first member.

7. The laser module according to claim 6, wherein
the support member is divided into the first member and the second member with a plane along the first surface as a boundary surface.

8. The laser module according to claim 6, wherein
the support member is divided into the first member and the second member with a plane along the second surface as a boundary surface.

9. The laser module according to claim 6, wherein
the first member is formed of a material having a thermal conductivity higher than that of the second member.

10. The laser module according to claim 1, wherein
the first portion includes a fourth surface connected to the first surface and facing toward the second side in the second direction, and
the second substrate-surface, the second active-layer-surface, and the fourth surface are formed to be flush with each other.

11. The laser module according to claim 1, wherein
the first portion includes a fourth surface connected to the first surface and facing toward the second side in the second direction, and
the second substrate-surface and the second active-layer-surface protrude further toward the second side than the fourth surface.

12. The laser module according to claim 1, wherein
the first surface is adhered to the fourth substrate-surface via an adhesive layer, and
the second surface is not adhered to the first substrate-surface.

13. The laser module according to claim 1, wherein
the first surface is adhered to the fourth substrate-surface via a first adhesive layer,
the second surface is adhered to the first substrate-surface via a second adhesive layer, and
the second adhesive layer has substantially the same refractive index as that of the second portion of the support member.

14. The laser module according to claim 1, wherein
the second portion has substantially the same refractive index as that of the substrate.

15. The laser module according to claim 1, further comprising a first lens that is disposed at a position facing the third surface and configured to transmit the terahertz wave propagated inside the support member.

16. The laser module of claim 15, wherein
a lens surface of the first lens facing the support member is in contact with the third surface, and
the first lens has substantially the same refractive index as that of the second portion.

17. The laser module according to claim 1, wherein
when viewed from the third direction, the support member does not overlap with the quantum cascade laser element.

18. The laser module of claim 1, wherein
the support member includes a wall portion erected on the first surface so as to face at least a part of the substrate on one side of the quantum cascade laser element in the third direction.

19. The laser module of claim 1, further comprising:
a holder configured to hold the quantum cascade laser element and the support member; and
a package that accommodates the quantum cascade laser element, the support member, and the holder.

20. The laser module of claim 19, further comprising:
a first lens that is disposed at a position facing the third surface and configured to transmit the terahertz wave propagated inside the support member;
a movable diffraction grating constituting an external resonator for the light of the first frequency; and
a second lens that is disposed between the quantum cascade laser element and the movable diffraction grating, and configured to transmit output light emitted from the second active-layer-surface and light returning from the movable diffraction grating to the quantum cascade laser element, wherein
the package further accommodates the movable diffraction grating and the second lens, and
an optical path between the first lens and the movable diffraction grating is disposed inside the package.

* * * * *